US009628140B2

United States Patent
Xie et al.

(10) Patent No.: US 9,628,140 B2
(45) Date of Patent: Apr. 18, 2017

(54) METHOD AND SYSTEM FOR DETERMINING SOUNDING REFERENCE SIGNAL FREQUENCY HOPPING PATTERN

(71) Applicant: ZTE CORPORATION, Shenzhen, Guangdong Province (CN)

(72) Inventors: Yining Xie, Shenzhen (CN); Chunli Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/902,444

(22) PCT Filed: May 13, 2014

(86) PCT No.: PCT/CN2014/000495
§ 371 (c)(1),
(2) Date: Mar. 4, 2016

(87) PCT Pub. No.: WO2014/173183
PCT Pub. Date: Oct. 30, 2014

(65) Prior Publication Data
US 2016/0277065 A1      Sep. 22, 2016

(30) Foreign Application Priority Data

Jul. 1, 2013   (CN) .......................... 2013 1 0274689

(51) Int. Cl.
*H04B 1/71*      (2011.01)
*H04B 1/7143*    (2011.01)
(Continued)

(52) U.S. Cl.
CPC ......... *H04B 1/7143* (2013.01); *H04L 5/0048* (2013.01); *H04L 5/0051* (2013.01);
(Continued)

(58) Field of Classification Search
CPC ........ H04B 1/7143; H04B 2201/71384; H04L 5/0048; H04L 5/0051; H04L 5/0094; H04W 72/0453
(Continued)

(56) References Cited

U.S. PATENT DOCUMENTS 9,363,055 B2 *  6/2016  Zeng ....................... H04L 5/001
2009/0238241 A1   9/2009  Hooli

FOREIGN PATENT DOCUMENTS

CN   101651469 A   2/2010
CN   101771463 A   7/2010
CN   101795145 A   8/2010

OTHER PUBLICATIONS

International Search and Written Opinion mailed Aug. 15, 2014 in PCT/CN2014/000495.

* cited by examiner

*Primary Examiner* — Michael Neff
(74) *Attorney, Agent, or Firm* — Plumsea Law Group, LLC

(57) ABSTRACT

Disclosed are a method, system and device for determining an SRS frequency hopping pattern. The method includes: user equipment constructing a parent table which contains a plurality of child tables; determining an SRS frequency-domain reference position p according to $N_{RB}^{UL}$, $C_{SRS}$, $n_{RRC}$ and $b_{hop}$; calculating $n'_{RRC}$ according to $N_{RB}^{UL}$, $C_{SRS}$ and $n_{RRC}$ and selecting a child table from the parent table according to the $n'_{RRC}$; according to the $n_{SRS}$ and the selected child table, taking $n'_{SRS}=(n_{SRS} \bmod P) \cdot S$ as an index to look up the table to obtain an SRS frequency hopping frequency-domain position offset q in each SRS frequency hopping period according to an SRS frequency hopping bandwidth parameter $b_{hop}$ and an SRS-bandwidth parameter $B_{SRS}$ distributed by an eNodeB; calculating r=p+q and calculating an
(Continued)

SRS transmission frequency-domain subcarrier offset $k_0$; repeating the processing for P times within one SRS frequency hopping period to obtain an SRS frequency hopping pattern.

20 Claims, 7 Drawing Sheets

(51) Int. Cl.
  *H04L 5/00* (2006.01)
  *H04W 72/04* (2009.01)
(52) U.S. Cl.
  CPC ....... *H04L 5/0094* (2013.01); *H04W 72/0453* (2013.01); *H04B 2201/71384* (2013.01)
(58) Field of Classification Search
  USPC .......................................................... 375/132
  See application file for complete search history.

METHOD AND SYSTEM FOR DETERMINING SOUNDING REFERENCE SIGNAL FREQUENCY HOPPING PATTERN

CROSS-REFERENCE TO RELATED APPLICATION(S)

This application is the U.S. National Phase application of PCT application number PCT/CN2014/000495 having a PCT filing date of May 13, 2014, which claims priority of Chinese patent application 201310274689.2 filed on Jul. 1, 2013, the disclosures of which are hereby incorporated by reference.

TECHNICAL FIELD

The present document relates to the field of wireless communications, and more particularly, to a user equipment (UE) in the Third Generation Partnership Project (3GPP) Long Term Evolution (LTE) system, and a method for determining a Sounding Reference Signaling (SRS) frequency hopping pattern in uplink transmission.

BACKGROUND OF THE INVENTION

In the 3GPP LTE system, in order to assist an evolved NodeB (eNodeB) to perform uplink channel measurement, the eNodeB configures the UEs located within the cell to send sounding reference signals (hereinafter referred to as the SRS) on certain time-frequency resources. Based on the received SRS measurement result, the eNodeB performs frequency-domain scheduling for the physical uplink shared channel (PUSCH) transmission of the UE, and determines a modulation and coding scheme used by the uplink traffic channel transmissions to improve the spectrum efficiency of the uplink.

In the LTE system, the channel bandwidth is divided into a plurality of resource blocks (RB), all uplink signals or channels are allocated by taking the resource block as the unit. In the frequency-domain, a width of one RB is 12 subcarriers, i.e. 180 kHz. The total number of resource blocks in the channel bandwidth is determined by the channel bandwidth, for example, in the LTE system, the 20 MHz bandwidth option comprises a total of 100 RBs, and the 10 MHz bandwidth option comprises a total of 50 RBs.

For the uplink channel sounding, when allocating SRS resources to the UEs, the eNodeB needs to ensure that the SRS transmission signals of the respective UEs are orthogonal to each other. For example, the eNodeB allocates different time resources (subframes), and/or different frequency resource (RB), and/or different code resources (cyclic shift) to respective UEs to divide available SRS resources within the cell, thus ensuring that the SRSs transmitted by the respective UEs do not interfere with each other. Furthermore, in order to ensure the single carrier characteristics (SC-FDMA) of uplink signals, the eNodeB always configures each UE to transmit the SRS in a plurality of consecutive RBs, i.e. the SRS transmission bandwidth always contains several consecutive RBs.

Aiming to the above-mentioned system requirements, the 3GPP LTE specification TS 36.211 Section 5.5.3.2 defined different SRS bandwidth configuration parameters (Table 5.5.3.2-1~Table 5.5.3.2-4) for different channel bandwidths. For example, taking the 20 MHz bandwidth (the uplink comprises 100 RBs) as an example, see the following table:

| SRS bandwidth configuration ($C_{SRS}$) | SRS-bandwidth $B_{SRS}=0$ | | SRS-bandwidth $B_{SRS}=1$ | | SRS-bandwidth $B_{SRS}=2$ | | SRS-bandwidth $B_{SRS}=3$ | |
|---|---|---|---|---|---|---|---|---|
| | $M_{SRS,0}$ | $N_0$ | $M_{SRS,1}$ | $N_1$ | $M_{SRS,2}$ | $N_2$ | $M_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In the above table, the parameter "SRS bandwidth configuration" represents the total frequency-domain resources allocated by the eNodeB to the SRS transmission of all UEs within a cell, so that it is a cell-specific parameter; another parameter "SRS-Bandwidth" is UE-specific bandwidth allocated to the actual SRS transmission depending on the system requirements. For convenience, the SRS bandwidth configuration is represented by the variable $C_{SRS}$, while the SRS-bandwidth is represented by the variable $B_{SRS}$. In order to provide a flexible configuration, the eNodeB can respectively configure the parameters $C_{SRS}$ and $B_{SRS}$ based on the actual requirements. Taking the above table as an example, the cell allows eight kinds of SRS bandwidth configurations, wherein the minimum one has 48 RBs and the maximum one has 96 RBs; and for the UE-specific, it is allowed to have four different SRS-Bandwidth configurations, the minimum one can have four RBs, and the maximum one can occupy the entire SRS bandwidth configuration. Since in the LTE system, the minimum SRS bandwidth is 4RBs and it allows to transmit within the frequency-domain range of up to 96 RBs, thus there are 96/4=24 possible transmission starting positions in the frequency-domain. Accordingly, the eNodeB specifies an SRS frequency-domain position index parameter $n_{RRC}$ whose value range is integers in the [0, 23] for each UE, and according to this parameter, the UE can decide the frequency-domain position at which it sends the SRS.

From the point of view of frequency-domain resource allocation, on the one hand, in order to obtain better frequency-domain scheduling gain, the UE is desired to transmit the SRS within a relatively wide frequency range, i.e. the SRS transmission bandwidth needs to be set large, so that the eNodeB can obtain the uplink channel measurement result within the almost entire channel bandwidth; but on the other hand, considering that there might be a large number of UEs within a cell needing to transmit the SRS, while the total resources allocated to the SRS transmission in the uplink are limited, therefore, it is also desirable to limit the bandwidth for SRS transmission of each UE. To resolve this conflict, an SRS "Frequency hopping" mode was defined in the LTE specification. In the frequency hopping mode, although the bandwidth for each SRS transmission of the UE is relatively small, but by transmitting at different times and different frequency-domain positions, a wide bandwidth may be completely covered after one SRS frequency hopping period. Taking the frequency hopping pattern shown in FIG. 1 as an example, see the above table, assume that parameters $C_{SRS}=6$, $B_{SRS}=3$ and $n_{RRC}=0$, the black box in the figure represents that the SRS is transmitted at the corresponding frequency-domain position, and the white box represents that the SRS is not transmitted. Assume that the eNodeB enables the SRS frequency hopping, each SRS transmission bandwidth is actually four RBs, after the SRS is transmitted at 48/4=12 different frequency-domain positions within one SRS frequency hopping period, it can cover the spectrum portion of the entire 48 RBs, then the frequency hopping pattern is continuously repeated in the next SRS frequency hopping period. Wherein, the starting RB offset sequence selected by the SRS transmission within one SRS frequency hopping period is called SRS "frequency hopping pattern", in the example, the SRS frequency hopping pattern is {0, 6, 3, 9, 1, 7, 4, 10, 3, 8, 5, 11}. Although different UEs within a cell may have the same frequency hopping pattern, the conflicts of SRS transmission frequency-domain positions between the UEs can be avoided by taking the SRS frequency-domain position index $n_{RRC}$ as the "reference", so that they do not interfere with each other.

A "tree" structure is adopted in the 3GPP specifications to assist to define the SRS frequency hopping pattern. The "tree" comprises up to four layers, respectively marked with b=0, 1, 2, 3, wherein b=0 corresponds to the top layer of the "tree", that is, the root node. In the $b^{th}$ layer, the number of RBs contained in each node in frequency on the "tree" equals to $m_{SRS,b}$, while $N_b$ represents the number of branch nodes located in the $b^{th}$ layer and contained in the $(b-1)^{th}$ layer nodes. In the "tree" type structure, each node in the $b^{th}$ layer can be uniquely determined by a group of identifiers $\{n_0, n_1, \ldots, n_b\}$ ($0 \le n_b < N_b$) in the $0^{th} \sim b^{th}$ layers. Each node on the "Tree" represents the starting offset and bandwidth occupied by the SRS transmission in frequency-domain. See the example of a tree structure in FIG. 2, wherein, in each node, a digital ID $n_b$ is displayed.

If the eNodeB enables the SRS frequency hopping, on the one hand, the UE can determine the layer where it is located on the "tree" based on $b=B_{SRS}$ according to the SRS bandwidth configuration $B_{SRS}$ by configured by the eNodeB, and obtain that the actual bandwidth of each SRS transmission equals to $m_{SRS,B_{SRS}}$. On the other hand, the UE can determine another layer where it is located on the "tree" based on $b=b_{hop}$ and according to the "SRS frequency hopping bandwidth" parameter $b_{hop}$ configured by the eNodeB, and obtain that the total bandwidth covered by the SRS frequency hopping equals to $m_{SRS,b_{hop}}$. Thus, based on the "tree" structure, it can easily define the SRS frequency hopping pattern: determine the offset and bandwidth of the corresponding SRS transmission in the frequency-domain according to the SRS transmission occasion counter $n_{SRS}$, that is, determine a group of identifiers $\{n_0, n_1, \ldots, n_b\}$. In the 3GPP LTE specification TS 36.211 Section 5.5.3.2, the following equation is used to define $n_b$ (b=0, 1, ..., $B_{SRS}$):

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}$$

The physics meaning of the above equation may be understood in two aspects, in one aspect, the reference position of SRS transmission is determined according to the SRS frequency-domain location index $n_{RRC}$ configured by the eNodeB: $\{n_b = \lfloor 4n_{RRC}/m_{SRS,b} \rfloor \bmod N_b | b=0, 1, \ldots, B_{SRS}\}$; in the other aspect, adding an SRS frequency hopping pattern frequency-domain offset $F_b(n_{SRS})$ from the $(b_{hop}+1)^{th}$ layer to the $(B_{SRS})^{th}$ layer on this basis to finally obtain the actual frequency-domain SRS transmission position. Please be noted that this equation unifies two cases of SRS frequency hopping disabled and enabled, and for the scenario that the SRS frequency hopping is disabled, the eNodeB only needs to configure $b_{hop} \ge B_{SRS}$, then the lower branch in the following equation will not be used to calculate the frequency hopping pattern frequency-domain offset $F_b(n_{SRS})$. When the SRS frequency hopping is disabled, it can directly calculate to obtain the SRS transmission frequency-domain position, and the SRS transmission frequency-domain offset with 4 RBs being the unit equals to $\lfloor ((4 \cdot n_{RRC}) \bmod m_{SRS,0}/m_{SRS,B_{SRS}}) \rfloor \cdot m_{SRS,B_{SRS}}/4$. The example in FIG. 1 gives the association between the values of $\{n_0, n_1, \ldots, n_b\}$ and the actual frequency hopping positions when the SRS frequency hopping is enabled. The frequency hopping pattern period equals to $m_{SRS,b_{hop}}/m_{SRS,B_{SRS}}$.

The SRS frequency hopping pattern determining principle comprises two points: (1) it is not repeated within one frequency hopping period, and fully covers the target SRS bandwidth configuration; (2) the frequency interval between two consecutive SRS transmission frequency-domain positions should be as large as possible. To meet the above-mentioned requirements, the 3GPP LTE specification TS 36.211 Section 5.5.3.2 also gives an equation to calculate the SRS frequency hopping pattern frequency-domain offset $F_b(n_{SRS})$:

$$F_b(n_{SRS}) = \begin{cases} (N_b/2) \left\lfloor \dfrac{n_{SRS} \bmod \Pi_{b'=b_{hop}}^{b} N_{b'}}{\Pi_{b'=b_{hop}}^{b-1} N_{b'}} \right\rfloor + \\ \qquad \left\lfloor \dfrac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ is even} \\ \lfloor N_b/2 \rfloor \lfloor n_{SRS}/\Pi_{b'=b_{hop}}^{b-1} N_{b'} \rfloor & \text{if } N_b \text{ is odd} \end{cases}$$

According to the above equation, the UE can calculate the SRS frequency hopping pattern frequency-domain offset, so as to further determine the frequency-domain position of the SRS frequency hopping transmission. Similar solutions are also included in the U.S. patent application with the Patent Application No. of US20090238241 and the title of "FREQUENCY HOPPING PATTERN AND ARRANGEMENT FOR SOUNDING REFERENCE SIGNAL".

It can be seen from the above equation that, even if the equation can unambiguously give the equation to calculate the SRS frequency hopping pattern frequency-domain offset and its form is relatively simple, the computational complexity of the UE is relatively high because the calculation involves multiplication ($\Pi_{b'=b_{hop}}^{b} N_{b'}$), modulo (mod), rounding down ($\lfloor \cdot \rfloor$) operation and multiplication/division. In addition, the calculation of the reference position of the associated SRS transmission, i.e., determining the $n_b$ value according to the equation $\lfloor 4n_{RRC}/m_{SRS,b} \rfloor \bmod N_b$, also relates to calculations such as division, rounding down, module and the like.

The UE uses the above-mentioned equation to on-line calculate the SRS frequency hopping pattern, which will bring no small complexity: if the soft way of processor is used to calculate, it will result in that the working frequency required by the UE processor is higher, increasing the power consumption; if the hardware circuit is used to calculate, it will increase the overhead of the hardware circuit, resulting in increased cost of the UE.

Additionally, although defining the SRS frequency hopping pattern based on the "tree" structure is relatively concise in form, the UE needs to respectively calculate the serial number $n_b$ of each layer on the "tree" structure according to the relevant SRS parameter configuration of the eNodeB at the time of implementation, and then obtains the SRS frequency hopping pattern through the subsequent processing, which also increases the complexity of the UE implementation.

SUMMARY

To solve the technical problem, the present document is to provide a method and system for determining a sounding reference signal frequency hopping pattern by looking up a table to allow a user equipment (UE) quickly and easily to determine an SRS frequency hopping pattern according to relevant SRS transmission parameters configured by an eNodeB.

To solve the above-mentioned technical problem, the present document discloses a method for determining a sounding reference signal frequency hopping pattern, wherein the method comprises:

A user equipment (UE) constructing a parent table, wherein the constructed parent table contains a plurality of child tables, wherein, each value combination of a bandwidth configuration parameter ($C_{SRS}$) and an $n'_{RRC}$ value corresponds to a child table;

the UE determining an SRS frequency-domain reference position p according to a system uplink bandwidth $N_{RB}^{UL}$, and an SRS bandwidth configuration parameter $C_{SRS}$, an SRS frequency-domain position index $n_{RRC}$ and an SRS frequency hopping bandwidth parameter $b_{hop}$ distributed by an eNodeB;

the UE calculating another $n'_{RRC}$ according to the system uplink bandwidth $N_{RB}^{UL}$, the SRS bandwidth configuration parameter $C_{SRS}$ distributed by the eNodeB, and based on the frequency-domain position index $n_{RRC}$, and selecting a child table from the constructed parent table according to the obtained $n'_{RRC}$;

the UE obtaining an SRS frequency hopping frequency-domain position offset q by looking up the table and taking $n'_{SRS}=(nSRS \bmod P) \cdot S$ as an index, according to an SRS transmission occasion counter $n_{SRS}$ and based on the selected child table, in each SRS frequency hopping period, according to the SRS frequency hopping bandwidth parameter $b_{hop}$ and the SRS bandwidth parameter $B_{SRS}$ distributed by the eNodeB;

adding the SRS frequency-domain reference position p and the SRS frequency hopping frequency-domain position offset q to obtain a current SRS transmission frequency-domain position r=p+q;

calculating an SRS transmission frequency-domain subcarrier offset $k_0$ according to the SRS transmission frequency-domain position r;

repeating the above-mentioned processing steps for P times within one SRS frequency hopping period to obtain an SRS frequency hopping pattern, wherein, a value of P is determined based on $b_{hop}$ and $B_{SRS}$ together, and S is a step length related to $b_{hop}$.

Preferably, in the above-mentioned method, an SRS transmission frequency-domain reference position p is calculated according to the following equation:

$$p=\lfloor((4 \cdot n_{RRC}) \bmod m_{SRS,0}/m_{SRS,b_{hop}})\rfloor \cdot m_{SRS,b_{hop}}/4$$

In the above equation, $\lfloor \; \rfloor$ denotes a rounding down function; mod denotes a modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $b_{hop}$ distributed by the eNodeB.

Preferably, in the above-mentioned method, the child table in the constructed parent table comprises $D=m_{SRS,0}/4$ rows, respectively corresponding to all SRS transmission occasions within one SRS frequency hopping period when $b_{hop}=0$ and $B_{SRS}=3$, wherein, $m_{SRS,0}$ is determined by the system uplink bandwidth $N_{RB}^{UL}$ and the SRS bandwidth configuration parameter $C_{SRS}$ distributed by the eNodeB;

in the child table, each row comprises a non-negative integer d, where a value range of d is $0 \leq d < D$.

Preferably, in the above-mentioned method, the value of d in the child table is determined in accordance with the following equation:

$$d = \sum_{b=0}^{B_{SRS}} m_{SRS,b} n_b / 4$$

$$n_b = \begin{cases} \lfloor 4 n_{RRC}/m_{SRS,b} \rfloor \bmod N_b & b \leq b_{hop} \\ \{F_b(n_{SRS}) + \lfloor 4 n_{RRC}/m_{SRS,b} \rfloor\} \bmod N_b & \text{otherwise} \end{cases}, (b=0,1,2,3)$$

$$F_b(n_{SRS}) = \begin{cases} (N_b/2) \left\lfloor \dfrac{n_{SRS} \bmod \Pi_{b'=b_{hop}}^{b} N_{b'}}{\Pi_{b'=b_{hop}}^{b-1} N_{b'}} \right\rfloor + \left\lfloor \dfrac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ is even} \\ \lfloor N_b/2 \rfloor \lfloor n_{SRS} / \Pi_{b'=b_{hop}}^{b-1} N_{b'} \rfloor & \text{if } N_b \text{ is odd} \end{cases}$$

Wherein, mod denotes a modulo operation, $\lfloor \; \rfloor$ denotes a rounding down operation, and $\Pi$ denotes a series multiplication.

Preferably, in the above-mentioned method, values of P and S are determined according to the following equations:

$$P=m_{SRS,b_{hop}}/m_{SRS,B_{SRS}};$$

$$S=\Pi_{b=0}^{b=b_{hop}} N_b.$$

Preferably, the above-mentioned method further comprises:

The UE storing the constructed parent table, wherein the parent table comprises all possible combinations corresponding to parameters $N_{RB}^{UL}$, $C_{SRS}$ and $n'_{RRC}$ in turn, wherein, $n'_{RRC}=n_{RRC} \bmod (m_{SRS,b_{hop}}/4)$.

Preferably, in the above-mentioned method, the subcarrier offset $k_0$ is calculated in accordance with the following equation:

$$k_0=k'_0+4 \cdot N_{sc}^{RB} \cdot r$$

wherein, $k'_0$ is an SRS frequency position offset, $N_{sc}^{RB}$ is a number of subcarriers included in each RB.

The present document further discloses a device for determining a sounding reference signal frequency hopping pattern, comprising:

A first unit, configured to: construct a parent table, wherein the constructed parent table contains a plurality of child tables, wherein, each value combination of a bandwidth configuration parameter ($C_{SRS}$) and an $n'_{RRC}$ value corresponds to a child table;

a second unit, configured to: determine an SRS frequency-domain reference position p according to a system uplink bandwidth $N_{RB}^{UL}$, and an SRS bandwidth configuration parameter $C_{SRS}$, an SRS frequency-domain position index $n_{RRC}$ and an SRS frequency hopping bandwidth parameter $b_{hop}$ distributed by an eNodeB;

a third unit, configured to: calculate another $n'_{RRC}$ according to the system uplink bandwidth $N_{RB}^{UL}$, the SRS bandwidth configuration parameter $C_{SRS}$ distributed by the eNodeB, and based on the SRS frequency-domain position index $n_{RRC}$, and select a child table from the constructed parent table according to the obtained n'$_{RRC}$; and look up the table to obtain an SRS frequency hopping frequency-domain position offset q by taking n'$_{SRS}$=($n_{SRS}$ mod P)·S as an index according to an SRS transmission occasion counter $n_{SRS}$ and based on the selected child table in each SRS frequency hopping period according to the SRS frequency hopping bandwidth parameter $b_{hop}$ and an SRS bandwidth parameter $B_{SRS}$ distributed by then eNodeB; add the SRS frequency-domain reference position p and the SRS frequency hopping frequency-domain position offset q to obtain a current SRS transmission frequency-domain position r=p+q; calculate an SRS transmission frequency-domain subcarrier offset $k_0$ according to the SRS transmission frequency-domain position r, and repeat the above-mentioned processing steps for P times within one SRS frequency hopping period to obtain an SRS frequency hopping pattern, wherein, a value of P is determined based on $b_{hop}$ and $B_{SRS}$ together, and S is a step length related to $b_{hop}$.

Preferably, in the above-mentioned device, the second unit is configured to: calculate an SRS transmission frequency-domain reference position p according to the following equation:

$$p = \lfloor ((4 \cdot n_{RRC}) \bmod m_{SRS,0}/m_{SRS,b_{hop}}) \rfloor \cdot m_{SRS,b_{hop}}/4$$

In the above equation, $\lfloor \ \rfloor$ denotes a rounding down function; mod denotes a modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $b_{hop}$ distributed by the eNodeB.

Preferably, in the above mentioned device, the first unit is configured to: make the child table in the constructed parent table comprise D=$m_{SRS,0}$/4 rows, respectively corresponding to all SRS transmission occasions within one SRS frequency hopping period when $b_{hop}$=0 and $B_{SRS}$=3, wherein, $m_{SRS,0}$ is determined by the system uplink bandwidth $N_{RB}^{UL}$ and the SRS bandwidth configuration parameters $C_{SRS}$ distributed by the eNodeB; in the child table, each row comprises a non-negative integer d, where a value range of d is 0≤d<D.

Preferably, in the above-mentioned device, the first unit is configured to: when constructing the parent table, determine the value of d in the child table in accordance with the following equation:

$$d = \sum_{b=0}^{B_{SRS}} m_{SRS,b} n_b / 4$$

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}, (b = 0, 1, 2, 3)$$

$$F_b(n_{SRS}) = \begin{cases} (N_b/2)\left\lfloor \frac{n_{SRS} \bmod \Pi_{b'=b_{hop}}^{b} N_{b'}}{\Pi_{b'=b_{hop}}^{b-1} N_{b'}} \right\rfloor + \left\lfloor \frac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ is even} \\ \lfloor N_b/2 \rfloor \lfloor n_{SRS}/\Pi_{b'=b_{hop}}^{b-1} N_{b'} \rfloor & \text{if } N_b \text{ is odd} \end{cases}$$

Preferably, in the above mentioned device, the third unit is configured to: determine values of P and S according to the following equation:

$$P = m_{SRS,b_{hop}}/m_{SRS,B_{SRS}};$$

$$S = \Pi_{b=0}^{b=b_{hop}} N_b.$$

Preferably, in the above-mentioned device, the first unit is further configured to: store the constructed parent table, wherein the parent table comprises all possible combinations sequentially corresponding to parameters $N_{RB}^{UL}$, $C_{SRS}$ and n'$R_{RRC}$ in turn, wherein, n'$R_{RRC}$=$n_{RRC}$ mod ($m_{SRS,b_{hop}}$/4).

Preferably, in the above-mentioned device, the third unit is configured to: calculate the subcarrier offset $k_0$ in accordance with the following equation:

$$k_0 = k'_0 + 4 \cdot N_{sc}^{RB} \cdot r$$

wherein, $k'_0$ is an SRS frequency position offset, $N_{sc}^{RB}$ is a number of subcarriers included in each RB.

The present invention further discloses a method for determining a sounding reference signal (SRS) frequency hopping pattern, comprising the following steps:

A user equipment (UE) constructing a parent table, wherein the constructed parent table contains a plurality of child tables;

the UE determining an SRS frequency-domain reference position p according to a system uplink bandwidth $N_{RB}^{UL}$, and an SRS bandwidth configuration parameter $C_{SRS}$ and an SRS frequency-domain position index $n_{RRC}$ distributed by an eNodeB;

the UE selecting a child table from the constructed parent table according to the system uplink bandwidth $N_{RB}^{UL}$, and the SRS bandwidth configuration parameter $C_{SRS}$ distributed by the eNodeB;

the UE looking up the table to obtain an SRS frequency hopping frequency-domain position offset q by taking n'$_{SRS}$= ($n_{SRS}$ mod P)·S as an index, according to an SRS transmission occasion counter $n_{SRS}$ and based on the selected child table, in each SRS frequency hopping period, according to the SRS frequency hopping bandwidth parameter $b_{hop}$ and the SRS bandwidth parameter $B_{SRS}$ distributed by the eNodeB;

adding the SRS frequency-domain reference position p and the SRS frequency hopping frequency-domain position offset q to obtain a current SRS transmission frequency-domain position r=p+q;

calculating an SRS transmission frequency-domain subcarrier offset $k_0$ according to the SRS transmission frequency-domain position r;

repeating the above-mentioned processing steps for P times within one SRS frequency hopping period to obtain an SRS frequency hopping pattern, wherein, a value of P is determined based on $b_{hop}$ and $B_{SRS}$ together, and S is a step length related to $b_{hop}$.

Preferably, in the above-mentioned method, an SRS transmission frequency-domain reference position p is calculated according to the following equation:

$$p = \lfloor ((4 \cdot n_{RRC}) \bmod m_{SRS,0}/m_{SRS,b_{hop}}) \rfloor \cdot m_{SRS,b_{hop}}/4$$

In the above equation, $\lfloor \ \rfloor$ denotes a rounding down function; mod denotes a modulo operation, $m_{SRS,b_{hop}}$ is determined by the system uplink bandwidth $N_{RB}^{UL}$, the SRS bandwidth configuration parameter $C_{SRS}$ and the SRS bandwidth parameter $B_{SRS}$ distributed by the eNodeB.

Preferably, in the above-mentioned method, the child table comprises D=$m_{SRS,0}$/4 rows, respectively corresponding to all SRS transmission occasions within one SRS frequency hopping period when $b_{hop}=0$ and $B_{SRS}=3$, wherein, $m_{SRS,0}$ is determined by the system uplink bandwidth $N_{RB}^{UL}$ and the SRS bandwidth configuration parameter $C_{SRS}$ distributed by the eNodeB; in the child table, each row comprises a non-negative integer d, where d is calculated according to the following equation:

$$d(n_{SRS}) = \sum_{b=0}^{B_{SRS}} m_{SRS,b} F_b(n_{SRS})/4$$

wherein, $$F_b(n_{SRS}) = \begin{cases} (N_b/2) \left\lfloor \dfrac{n_{SRS} \bmod \Pi_{b'=b_{hop}}^{b} N_{b'}}{\Pi_{b'=b_{hop}}^{b-1} N_{b'}} \right\rfloor + \\ \left\lfloor \dfrac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ is even} \\ \lfloor N_b/2 \rfloor \lfloor n_{SRS} / \Pi_{b'=b_{hop}}^{b-1} N_{b'} \rfloor & \text{if } N_b \text{ is odd} \end{cases}$$

Preferably, in the above-mentioned method, values of P and S are determined according to the following equation:

$$P = m_{SRS,b_{hop}} / m_{SRS,B_{SRS}};$$

$$S = \Pi_{b=0}^{b=b_{hop}} N_b.$$

Preferably, in the above-mentioned method, the SRS transmission subcarrier offset $k_0$ is calculated according to the SRS transmission frequency-domain position r, and can be calculated in accordance with the following equation: $k_0 = k'_0 + 4 \cdot N_{sc}^{RB} \Psi r$, where $k'_0$ is an SRS frequency position offset, and $N_{sc}^{RB}$ is a number of subcarriers included in each RB.

The present document further discloses a device for determining a sounding reference signal (SRS) frequency hopping pattern, comprising:

A first unit, configured to: construct a parent table, wherein the constructed parent table contains a plurality of child tables;

a second unit, configured to: determine an SRS frequency-domain reference position p according to a system uplink bandwidth $N_{RB}^{UL}$, and an SRS bandwidth configuration parameter $C_{SRS}$ and an SRS frequency-domain position index $n_{RRC}$ distributed by an eNodeB;

a third unit, configured to: select a child table from the parent table according to the system uplink bandwidth $N_{RB}^{UL}$ and the SRS bandwidth configuration parameter $C_{SRS}$ distributed by the eNodeB, and look up the table to obtain an SRS frequency hopping frequency-domain position offset q by taking $n'_{SRS} = (n_{SRS} \bmod P) \cdot S$ as an index according to an SRS transmission occasion counter $n_{SRS}$ and based on the selected child table in each SRS frequency hopping period according to the SRS frequency hopping bandwidth parameter $b_{hop}$ and the SRS bandwidth parameter $B_{SRS}$ distributed by the eNodeB; add the SRS frequency-domain reference position p and the SRS frequency hopping frequency-domain position offset q to obtain a current SRS transmission frequency-domain position r=p+q, calculate an SRS transmission frequency-domain subcarrier offset $k_0$ according to the SRS transmission frequency-domain position r, and repeat the above-mentioned processing steps for P times within one SRS frequency hopping period to obtain an SRS frequency hopping pattern.

Preferably, in the above-mentioned device, the second unit is configured to: calculate an SRS transmission frequency-domain reference position p according to the following equation:

$$p = \lfloor ((4 \cdot n_{RRC}) \bmod m_{SRS,0} / m_{SRS,b_{hop}}) \rfloor \cdot m_{SRS,b_{hop}} / 4$$

In the above equation, $\lfloor \ \rfloor$ denotes a rounding down function; mod denotes a modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $B_{SRS}$ distributed by the eNodeB.

Preferably, in the above-mentioned device, the first unit is configured to, make the child table in the constructed parent table comprise $D = m_{SRS,0}/4$ rows, respectively corresponding to all SRS transmission occasions within one SRS frequency hopping period when $b_{hop}=0$ and $B_{SRS}=3$, wherein, $m_{SRS,0}$ is determined by the system uplink bandwidth $N_{RB}^{UL}$ and the SRS bandwidth configuration parameter $C_{SRS}$ distributed by the eNodeB; in the child table, each row comprises a non-negative integer d, wherein, d is calculated in accordance with the following equation:

$$d(n_{SRS}) = \sum_{b=0}^{B_{SRS}} m_{SRS,b} F_b(n_{SRS})/4$$

wherein $$F_b(n_{SRS}) = \begin{cases} (N_b/2) \left\lfloor \dfrac{n_{SRS} \bmod \Pi_{b'=b_{hop}}^{b} N_{b'}}{\Pi_{b'=b_{hop}}^{b-1} N_{b'}} \right\rfloor + \\ \left\lfloor \dfrac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ is even} \\ \lfloor N_b/2 \rfloor \lfloor n_{SRS}/\Pi_{b'=b_{hop}}^{b-1} N_{b'} \rfloor & \text{if } N_b \text{ is odd} \end{cases}.$$

Preferably, in the above-mentioned device, the second unit is configured to determine values of P and S according to the following equation:

$$P = m_{SRS,b_{hop}}/m_{SRS,B_{SRS}};$$

$$S = \Pi_{b=0}^{b=b_{hop}} N_b.$$

Preferably, in the above-mentioned device, the third unit is configured to: calculate the SRS transmission subcarrier offset $k_0$ in accordance with the SRS transmission frequency-domain position r, and calculate according to the following equation: $k_0 = k'_0 + 4 \cdot N_{sc}^{RB} \cdot r$, wherein, $k'_0$ is an SRS frequency position offset, and $NL_{sc}^{RB}$ is a number of subcarriers included in each RB.

Compared with the related art, the technical solution of the present application reduces the computational complexity of the process of the UE determining an SRS frequency hopping pattern through the method of looking up the table, so as to achieve the objective of saving the UE power or reducing the UE costs.

PREFERRED EMBODIMENTS OF THE INVENTION

Hereinafter in conjunction with the following drawings, the technical solution of the present document will be described in further detail. It should be noted that in the case of no conflict, embodiments and features in the embodiments of the present application may be arbitrarily combined with each other.

The First Embodiment

Figure 3:
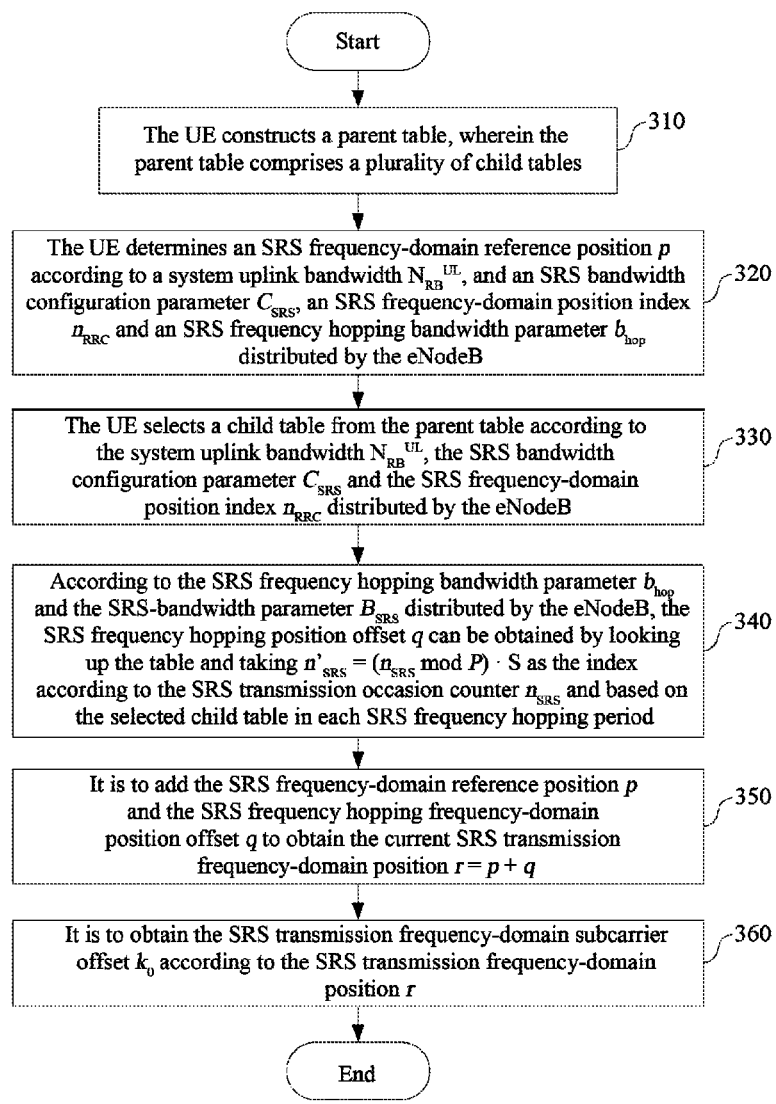
FIG. 3 is a flow chart of a UE using the method for determining a sounding reference signal frequency hopping pattern according to the present document.

The present embodiment provides a method for determining a sounding reference signal frequency hopping pattern by looking up a table, as shown in FIG. 3, comprising the following steps 310 to 360.

In step 310, the UE constructs a parent table, wherein the parent table comprises a plurality of child tables, wherein each value combination of a bandwidth configuration parameter ($C_{SRS}$) and an $n'_{RRC}$ value corresponds to a child table.

Figure 4:
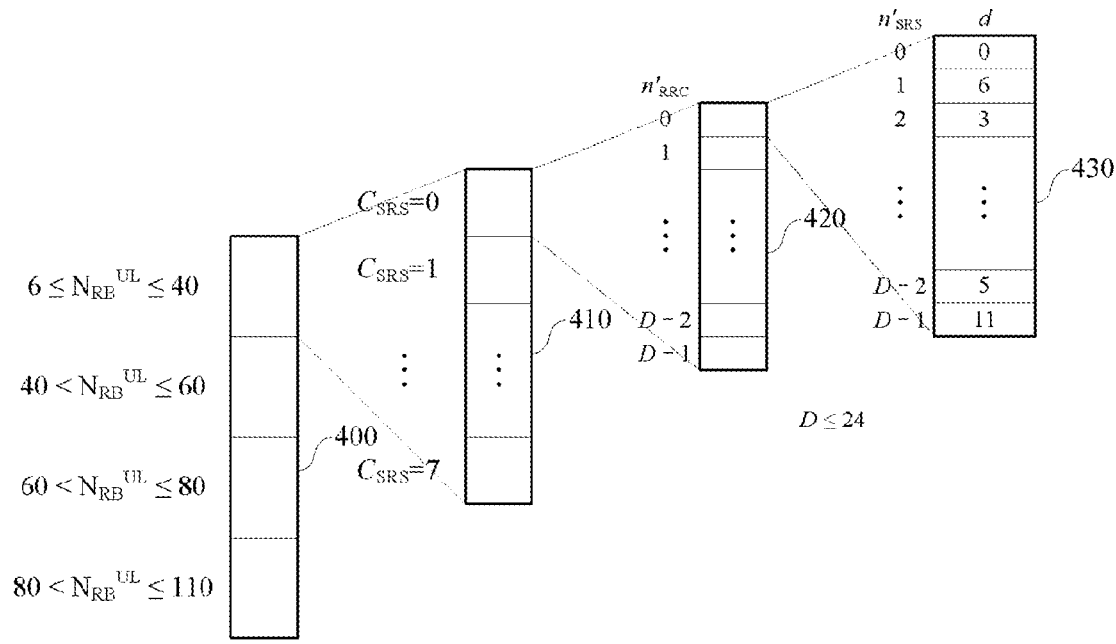
FIG. 4 is a schematic diagram of the structure of a constructed parent table (including a number of tables)

With the parent table, the UE can obtain the frequency offset of the SRS transmission frequency-domain position relative to a certain reference position by looking up the table according to the SRS frequency-domain position index $n_{RRC}$ configured by the eNodeB. The UE constructs the parent table in advance based on the relevant definitions in the 3GPP TS 36.211 specifications Section 5.5.3.2. See FIG. 4. According to the uplink bandwidth $N_{RB}^{UL}$, the parent table 400 comprises tables respectively corresponding to the four $N_{RB}^{UL}$ value ranges of $6 \leq N_{RB}^{UL} \leq 40$, $40 < N_{RB}^{UL} \leq 60$, $60 < N_{RB}^{UL} \leq 80$ and $80 < N_{RB}^{UL} \leq 110$. The table 410 which corresponds to a certain range therein comprises eight tables 420 respectively corresponding to all possible SRS bandwidth configurations $C_{SRS}$ ($0 \leq C_{SRS} \leq 7$). Furthermore, it comprises D child tables 430 separately corresponding to respective possible $n_{RRC}$ values ($0 \leq n_{RRC} \leq 23$). Herein, $D = m_{SRS,0}/4$, where $m_{SRS,0}$ is a positive integer determined based on $N_{RB}^{UL}$ and $C_{SRS}$, its value is a multiple of four and its maximum value is not more than 96, therefore the maximum value of D is not more than 24. Each child table 430 comprises D SRS frequency hopping pattern frequency-domain position offset values d respectively corresponding to the possible values of each SRS transmission counter $n_{SRS}$ within the frequency hopping period, and the offset value takes 4 RBs as a unit. For example, according to the relevant definitions in the 3GPP TS 36.211 specification Section 5.5.3.2, aiming at all possible combinations of parameters $N_{RB}^{UL}$, $C_{SRS}$ and $n_{RRC}$ in advance, the UE may determine the SRS frequency hopping pattern frequency-domain position offset value by assuming the parameter configuration of $b_{hop}=0$, $B_{SRS}=3$ within one SRS frequency hopping period. The related calculation involves the following equation in the 3GPP TS 36.211 specification section 5.5.3.2:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

and $$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ is even} \\ \lfloor N_b/2 \rfloor \left\lfloor n_{SRS} / \prod_{b'=b_{hop}}^{b-1} N_{b'} \right\rfloor & \text{if } N_b \text{ is odd} \end{cases}$$

(b=0, 1, 2, 3)

and $$d = \sum_{b=0}^{B_{SRS}} m_{SRS,b} n_b / 4$$

Taking into account that the value of d is a non-negative integer not more than D, i.e., its maximum value is not more than 24, so it can be denoted with at most 5 bits, and in order to facilitate the storage of each item, an integer byte should be used for the storage of each item, therefore no more than one byte is needed to store the d. Therefore, the construction of the parent table 400 is completed. According to the relevant definitions in the 36.211 specification section 5.5.3.2, the maximum values of $m_{SRS,0}$ do not exceed 36, 48, 72 and 96 respectively corresponding to four kinds of value ranges of $N_{RB}^{UL}$, therefore the numbers of rows D of the corresponding child tables are not more than 9, 12, 18 and 24 respectively. The parent table has a total of 4*8*D such child tables, wherein the number of items contained in each child table is not more than D, and the storage of each item is not more than one byte. Thus, the total size of the parent table does not exceed 8*(9*9+12*12+18*18+24*24)=9000 bytes. The UE can store the parent table in ROM or FLASH memory. The size of the child table does not exceed 24 bytes.

Figure 1:
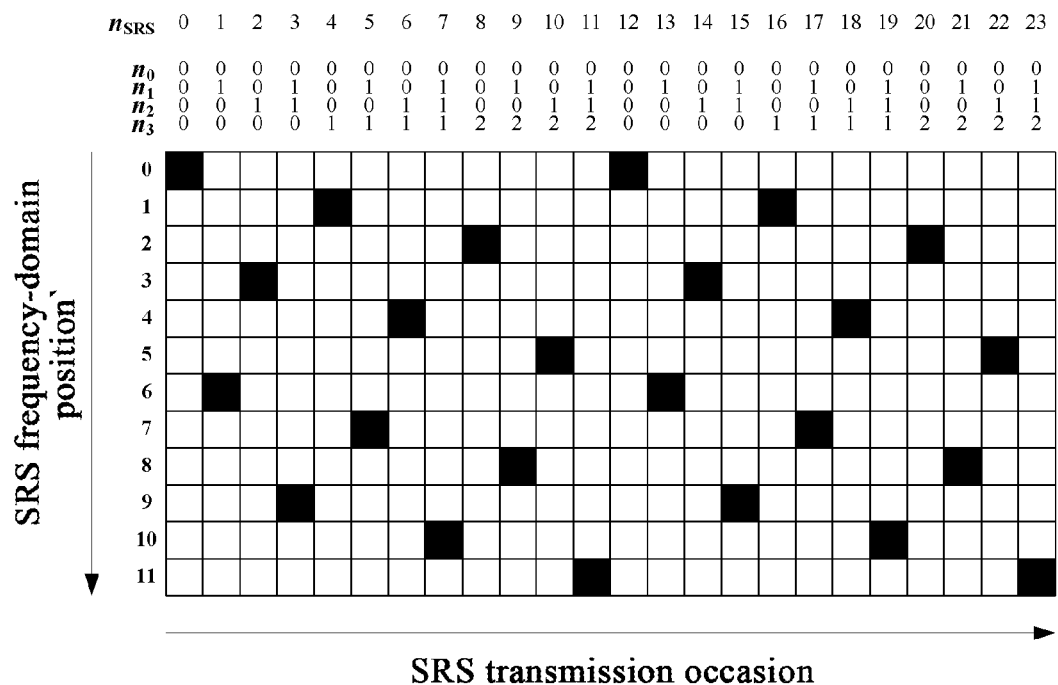
FIG. 1 is a schematic diagram of an SRS frequency hopping pattern.
Figure 2:
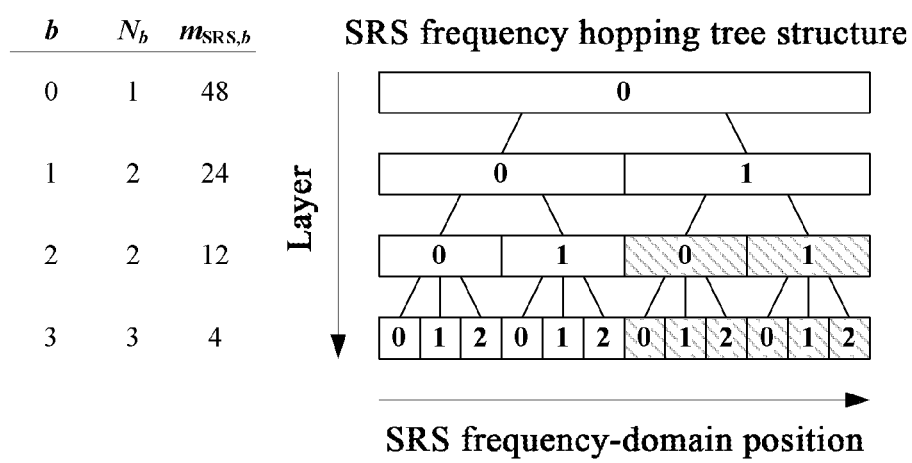
FIG. 2 is a schematic diagram of a "tree" structure used to determine the SRS frequency hopping pattern.

In step 320, the UE determines an SRS frequency-domain reference position p according to a system uplink bandwidth $N_{RB}^{UL}$, and an SRS bandwidth configuration parameter $C_{SRS}$, an SRS frequency-domain position index $n_{RRC}$ and a SRS frequency hopping bandwidth parameter $b_{hop}$ distributed by the eNodeB. In the present embodiment, it can be calculated according to the following equation:

$$p = \lfloor((4 \cdot n_{RRC}) \bmod m_{SRS,0}/m_{SRS,b_{hop}})\rfloor \cdot m_{SRS,b_{hop}}/4$$

wherein, floor denotes the rounding down function; $m_{SRS,b_{hop}}$ is determined through the system uplink bandwidth $N_{RB}^{UL}$, the SRS bandwidth configuration parameter $C_{SRS}$ and the SRS frequency hopping bandwidth parameter $b_{hop}$ distributed by the eNodeB. The SRS frequency-domain reference position p denotes the starting position of the equivalent total bandwidth covered by the frequency hopping pattern in the $(b_{hop})^{th}$ layer, which takes 4 RBs as the unit. Please note that the SRS frequency hopping is performed on all nodes lower than the $(b_{hop})^{th}$ layer, the covered total bandwidth after the SRS frequency hopping equals $m_{SRS,b_{hop}}$ RBs. For example, taking $N_{RB}^{UL}=100$, $C_{SRS}=6$ and $b_{hop}=1$ as an example, according to the 3GPP TS36.211 specification Section 5.5.3.2, it can be seen that $m_{SRS,0}=48$ and $m_{SRS,b_{hop}}=24$. Assume that the eNodeB configures $n_{RRC}=6$, it can be calculated that p=floor (4·6/24)·24/4=6. In this case, the SRS frequency hopping is performed on nodes lower than the $(b_{hop}=1)^{th}$ layer, the total covered bandwidth is equal to $m_{SRS,b_{hop}}=24$ RBs. Refer to FIG. 2, diagonal stripes section in the lower right corner portion comprises both cases corresponding to $B_{SRS}=2$ and $B_{SRS}=3$.

In step 330, the UE selects a child table from the parent table according to the system uplink bandwidth $N_{RB}^{UL}$, the SRS bandwidth configuration parameter $C_{SRS}$ and the SRS frequency-domain position index $n_{RRC}$ distributed by the eNodeB.

In this step, after accessing to the network and reading the system message and cell-common configuration distributed by the eNodeB, the UE can obtain the uplink bandwidth $N_{RB}^{UL}$ and the SRS bandwidth configuration parameter $C_{SRS}$; after reading the UE-specific configuration, it can obtain the SRS frequency-domain position index parameter $n_{RRC}$. Then, it can obtain $n'_{RRC}=n_{RRC}$ mod $(m_{SRS,b_{hop}}/4)$ according to $n_{RRC}$. The reason for this is that the valid parameter $n_{RRC}$ configuration is a non-negative integer in the range [0, 23], corresponding to the maximum SRS bandwidth of entire 96 RBs. However the real frequency hopping part is nodes located lower than the $(b_{hop})^{th}$ layer, therefore a mod operation needs to be performed on the SRS bandwidth of the $(b_{hop})^{th}$ layer, that is, $m_{SRS,b_{hop}}/4$, to obtain the index offset value in the total SRS frequency hopping bandwidth in order to carry out the child table look-up. It should be noted that, because the definition of $n_{RRC}$ takes 4 RBs as the unit, $m_{SRS,bhop}$ need to be divided by 4 first. The UE selects a child table from the parent table according to the system uplink bandwidth $N_{RB}^{UL}$, the SRS bandwidth configuration parameter $C_{SRS}$ distributed by the eNodeB and the parameter $n'_{RRC}$. For example, taking $N_{RB}^{UL}=100$, $C_{SRS}=6$ and $b_{hop}=1$ as an example, according to the 3GPP TS36.211 specification Section 5.5.3.2, it can be seen that $m_{SRS,b_{hop}}=24$. Assume that the eNodeB configures $n_{RRC}=6$, it can be calculated that $n'_{RRC}=6$ mod $(24/4)=0$, therefore in the parent table, the child table is selected according to $N_{RB}^{UL}=100$, $C_{SRS}=6$ and $n'_{RRC}=0$. The UE may load the selected child table from the ROM or FLASH into the DBB chip so that it can be accessed quickly. Since the size of the child table does not exceed 24 bytes, the overhead after loading into the DBB chip is very small.

In step 340, according to the SRS frequency hopping bandwidth parameter $b_{hop}$ and the SRS-bandwidth parameter $B_{SRS}$ distributed by the eNodeB, the SRS frequency hopping position offset q can be obtained by looking up the table and taking $n'_{SRS}=(n_{SRS}$ mod $P)\cdot S$ as the index according to the SRS transmission occasion counter $n_{SRS}$ and based on the selected child table in each SRS frequency hopping period.

The UE reads the SRS frequency hopping bandwidth parameter $b_{hop}$ in the specific configuration distributed by the eNodeB, then compares it with the parameter $B_{SRS}$ to determine whether the eNodeB enables the SRS frequency hopping. If $b_{hop} \geq B_{SRS}$, the eNodeB does not enable the SRS frequency hopping, at this time the UE can directly determine the SRS transmission frequency-domain position according to the SRS frequency-domain reference position p obtained from the calculation in the second step 320. If $b_{hop}<B_{SRS}$, the eNodeB enables the SRS frequency hopping, and the UE determines the index for looking up the child table, $n'_{SRS}=(n_{SRS}$ mod $P)\cdot S$ according to the SRS transmission occasion counter $n_{SRS}$ as well as the parameter $b_{hop}$. Wherein, the SRS frequency hopping period P is determined by the parameters $b_{hop}$ and $B_{SRS}$ together, and can be calculated according to the following equation:

$$P=m_{SRS,b_{hop}}/m_{SRS,B_{SRS}};$$

$$S=\Pi_{b=0}^{b=b_{hop}}N_b.$$

And the P value does not exceed the number of rows D in the child table. When $b_{hop}=0$, P=D is the number of rows in the child table, it is to select the step length $S=N_0=1$; when $b_{hop}>0$, the child table's "nested" feature can be used, and the child table is still used to look up the table, but the step length is modified to $S=\Pi_{b=0}^{b=b_{hop}} N_b$. From the process of looking up the table, the parameter S represents the step length between indexes for continuously looking up the table; while the parameter P represents taking S as the step length, and only the first P items in the table are taken, and it is to return back to the $0^{th}$ index after exceeding this range.

Figure 5:
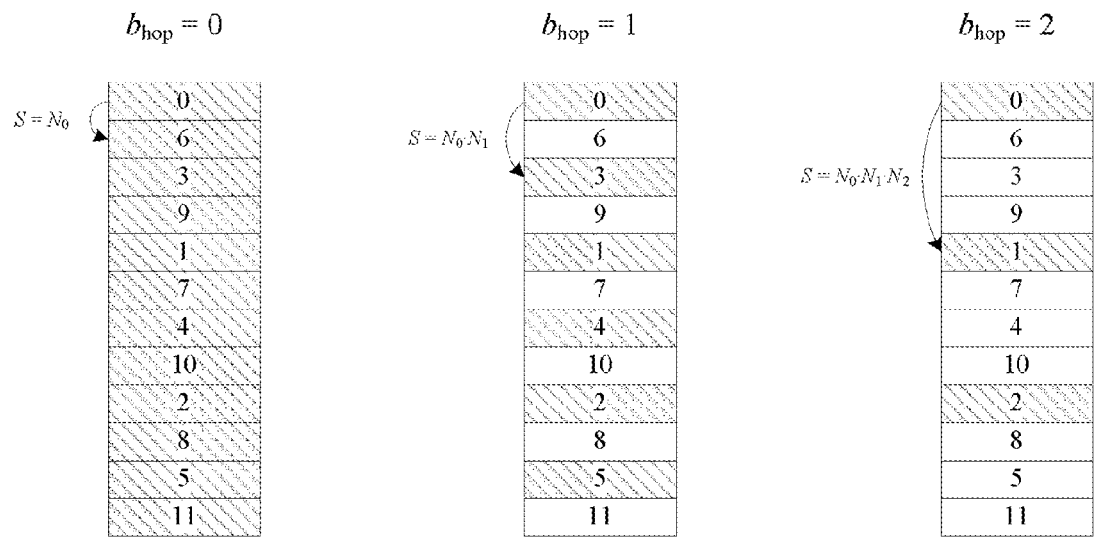
FIG. 5 is a schematic diagram of using different step lengths when looking up the child table according to different SRS frequency hopping parameter $b_{hop}$ configurations.

One example can refer to FIG. 5, the example assumes that $B_{SRS}=3$. Assume that the parameter configured by the eNodeB $b_{hop}=1$, according to the 3GPP specification TS36.211 Section 5.5.3.2, it can be seen that $m_{SRS,b_{hop}}=24$ and $m_{SRS,B_{SRS}}=4$, then it can determine that the period P=24/4=6; in addition, according to the 3GPP TS36.211 specification Section 5.5.3.2, it also can be seen that $N_0=1$ and $N_1=2$, and it can calculate to obtain the step length $S=1*2=2$. Thus, it is to look up the table according to $n'_{SRS}=(n_{SRS}$ mod $6)\cdot 2$, the $0^{th}$, $2^{nd}$, $4^{th}$, $6^{th}$, $8^{th}$ and $10^{th}$ items in the table can be taken based on all possible values of $n_{SRS}$, as shown by the box with diagonal stripes in FIG. 5.

Figure 6:
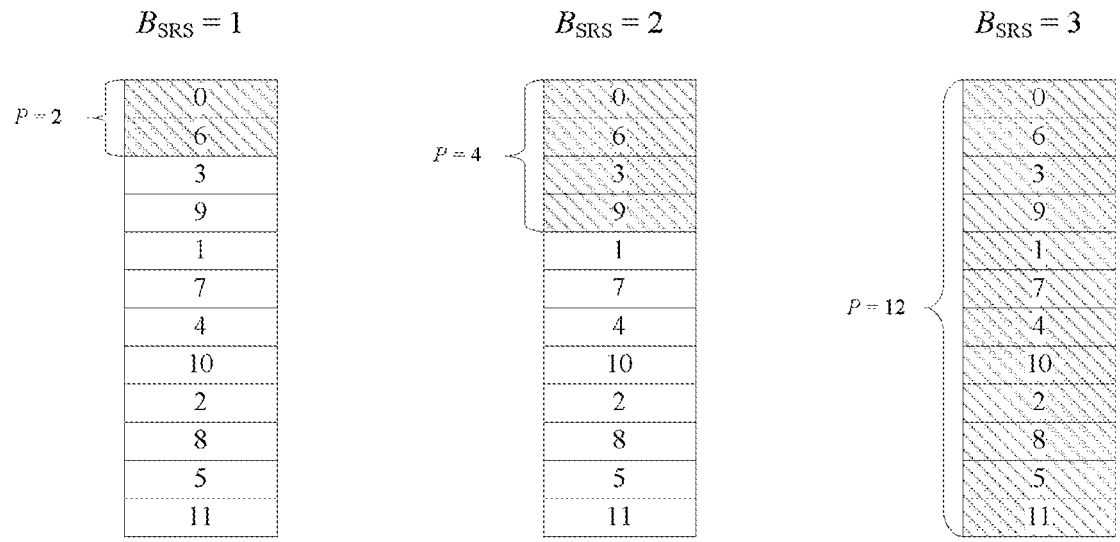
FIG. 6 is a schematic diagram of using different ranges when looking up the child table according to different SRS-bandwidth parameter BSRS configurations.

Another example can refer to FIG. 6, the example assumes that $b_{hop}=0$. Assume that the parameter configured by the eNodeB $B_{SRS}=2$, according to the 3GPP specification TS36.211 Section 5.5.3.2, it can be seen that $m_{SRS,b_{hop}}=48$ and $m_{SRS,B_{SRS}}=12$, and it can determine that the period P=48/12=4; in addition, according to the 3GPP TS36.211 specification Section 5.5.3.2, it also can be seen that $N_0=1$, and it can calculate to obtain the step length S=1. Thus, it is to look up the table according to $n'_{SRS}=(n_{SRS}$ mod $4)\cdot 1$, the $0^{th}$, $1^{st}$, $2^{nd}$ and $3^{rd}$ items in the table can be taken according to all possible values of $n_{SRS}$, as shown by the box with diagonal stripes in FIG. 6.

Figure 7:
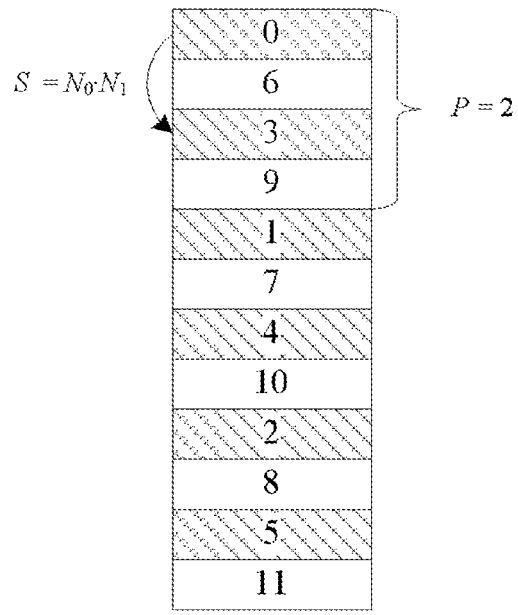
FIG. 7 is a schematic diagram of using corresponding step length and scope when looking up the child table according to the SRS frequency hopping parameter $b_{hop}$ and SRS-bandwidth parameter BSRS configuration.

Still another example can refer to FIG. 7, the example assumes that $b_{hop}=0$ and $B_{SRS}=2$. According to the 3GPP specification TS36.211 Section 5.5.3.2, it can be seen that $m_{SRS,b_{hop}}=24$ and $m_{SRS,B_{SRS}}=12$, then it can determine that the period P=24/12=2; in addition, according to the 3GPP TS36.211 specification Section 5.5.3.2, it also can be seen that $N_0=1$ and $N_1=2$, and it can calculate to obtain the step length $S=1*2=2$. Thus, it is to look up the table according to $n'_{SRS}=(n_{SRS}$ mod $2)\cdot 2$, and the $0^{th}$ and $2^{nd}$ items in the table can be taken according to all possible values of $n_{SRS}$, as shown by the box with diagonal stripes in FIG. 7.

Thereafter, based on the child table selected in the third step 330, it is to take n'$_{SRS}$ as an index, look up the child table to obtain the corresponding d value, and assign the d value to q, so as to determine the SRS frequency hopping frequency-domain position offset q.

In step 350, it is to add the SRS frequency-domain reference position p and the SRS frequency hopping frequency-domain position offset q to obtain the current SRS transmission frequency-domain position r=p+q.

Figure 8:
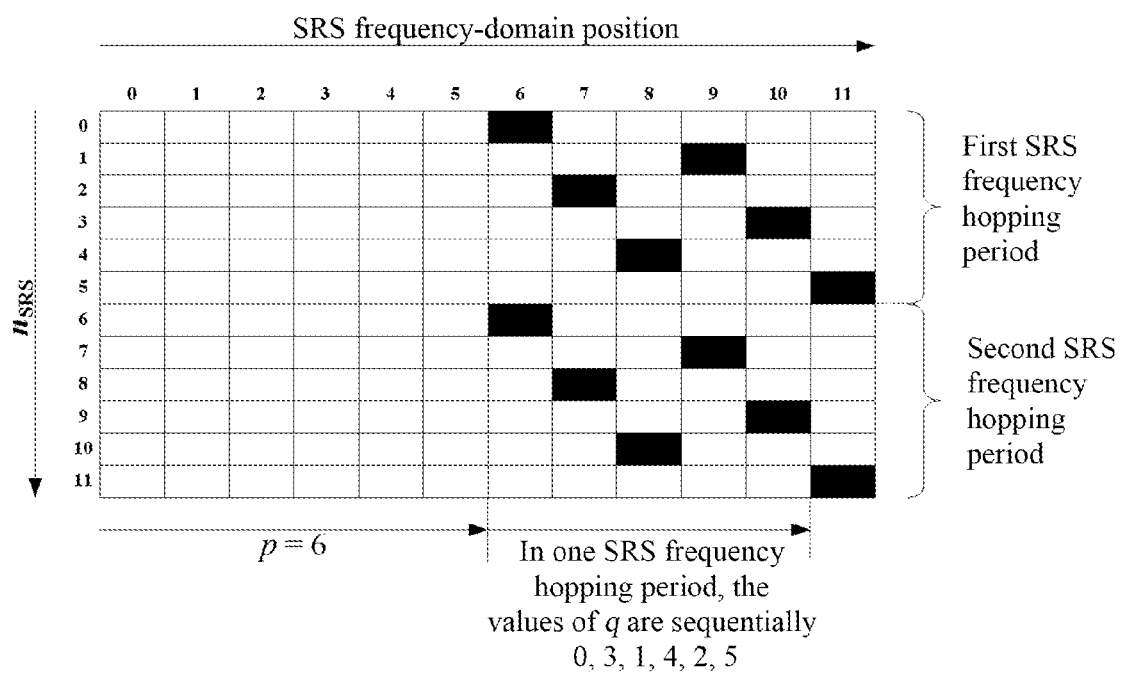
FIG. 8 is a schematic diagram of obtaining an SRS transmission frequency-domain position by adding the SRS frequency-domain reference position and the SRS frequency hopping frequency-domain position offset.

In this embodiment, the unit of the frequency-domain position is 4 RBs. See the example in FIG. 8, assume that $b_{hop}$=1, $B_{SRS}$=3 and $n_{RRC}$=6, the black box in the figure represents that the SRS is transmitted at the corresponding frequency-domain position, and the white box represents the SRS is not transmitted. Wherein, the SRS frequency-domain reference position p is obtained through the second step 320, while the SRS frequency hopping frequency-domain position offset q is obtained through the fourth step 340. In FIG. 6, p=6, and the q values can be obtained by looking up the table in one SRS frequency hopping period, sequentially 0, 3, 1, 4, 2, 5, and by adding the two parties together, the SRS transmission frequency-domain positions: 6+0=6, 6+3=9, 6+1=7, 6+4=10, 6+2=8, 6+5=11 within one SRS frequency hopping period can be obtained, herein the frequency-domain position takes four RBs as the unit.

In step 360, it is to obtain the SRS transmission frequency-domain subcarrier offset $k_0$ according to the SRS transmission frequency-domain position r.

Specifically, the SRS transmission subcarrier offset $k_0$ can be obtained according to the SRS transmission frequency-domain position r, and it can be calculated according to the following equation: $k_0 = k'_0 + 4 \cdot N_{sc}^{RB} \cdot r$, where $k'_0$ is an SRS frequency position offset, $N_{sc}^{RB}$ denotes the number of subcarriers contained in each RB, in the LTE system, $N_{sc}^{RB}$=12, i.e., one RB comprises 12 subcarriers. Herein, since the SRS frequency-domain position r calculated in the fifth step 350 takes 4 RBs as the unit, it needs to be multiplied with $4 \cdot N_{sc}^{RB}$ to be converted into the subcarrier. While $k'_0$ is an SRS transmission sub-carrier offset value, for example, according to the 3GPP TS36.211 Specifications Section 5.5.3.2, it is calculated according to the following equation in the conventional subframe:

$$k'_0 = (\lfloor N_{RB}^{UL}/2 \rfloor - m_{SRS,0}/2)N_{SC}^{RB} + k_{TC},$$

wherein the value of the parameter $k_{TC}$ is equal to 0 or 1, which is indicated to the eNodeB by the UE in a specific configuration.

The Second Embodiment

The present embodiment further provides a preferred method for determining a Sounding reference signal frequency hopping pattern, comprising the following steps:

a user equipment (UE) constructing a parent table, wherein the constructed parent table contains a plurality of child tables;

the UE determining an SRS frequency-domain reference position p according to the system uplink bandwidth $N_{RB}^{UL}$, the SRS bandwidth configuration parameter $C_{SRS}$ and the SRS frequency-domain position index $n_{RRC}$ distributed by the eNodeB;

the UE selecting a child table from the constructed parent table according to the system uplink bandwidth $N_{RB}^{UL}$ and the SRS bandwidth configuration parameter $C_{SRS}$ distributed by the eNodeB;

the UE looking up the table to obtain an SRS frequency hopping frequency-domain position offset q by taking n'$_{SRS}$= ($n_{SRS}$ mod P)·S as an index according to the SRS transmission occasion counter $n_{SRS}$ and based on the selected child table, in each SRS frequency hopping period, according to the SRS frequency hopping bandwidth parameter $b_{hop}$ and the SRS bandwidth parameter $B_{SRS}$ distributed by the eNodeB;

adding the SRS frequency-domain reference position p and the SRS frequency hopping frequency-domain position offset q to obtain a current SRS transmission frequency-domain position r=p+q;

calculating an SRS transmission frequency-domain subcarrier offset $k_0$ according to the SRS transmission frequency-domain position r;

repeating the above-mentioned processing steps for P times within one SRS frequency hopping period to obtain an SRS frequency hopping pattern.

It should be noted that, the child table in the parent table constructed with the above-mentioned method comprises D=$m_{SRS,0}$/4 rows, respectively corresponding to all the SRS transmission occasions in one SRS frequency hopping period when $b_{hop}$=0 and $B_{SRS}$=3, wherein $m_{SRS,0}$ is determined by the system uplink bandwidth $N_{RB}^{UL}$ and the SRS bandwidth configuration parameter $C_{SRS}$ distributed by the eNodeB; in each child table, each row comprises a non-negative integer d; wherein the value of d may be calculated in accordance with the following equation:

$$d(n_{SRS}) = \sum_{b=0}^{B_{SRS}} m_{SRS,b} F_b(n_{SRS})/4$$

wherein, $$F_b(n_{SRS}) =$$

$$\begin{cases} (N_b/2) \left[ \dfrac{\left\lfloor n_{SRS} \bmod \prod_{b'=b_{hop}}^{b} N_{b'} \right\rfloor}{\prod_{b'=b_{hop}}^{b-1} N_{b'}} + \dfrac{\left\lfloor n_{SRS} \bmod \prod_{b'=b_{hop}}^{b} N_{b'} \right\rfloor}{2 \prod_{b'=b_{hop}}^{b-1} N_{b'}} \right] & \text{if } N_b \text{ is even} \\ \lfloor N_b/2 \rfloor \left\lfloor n_{SRS} / \prod_{b'=b_{hop}}^{b-1} N_{b'} \right\rfloor & \text{if } N_b \text{ is odd} \end{cases}$$

Specifically, in the above-mentioned process, one SRS transmission frequency-domain reference position p is calculated according to the following equation:

$$p = \lfloor ((4 \cdot n_{RRC}) \bmod m_{SRS,0}/m_{SRS,b_{hop}}) \rfloor \cdot m_{SRS,b_{hop}}/4$$

In the above equation, $\lfloor \ \rfloor$ denotes the rounding down function; mod denotes the modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $b_{hop}$ distributed by the eNodeB.

The SRS frequency hopping period P is determined by the parameters $b_{hop}$ and $B_{SRS}$ together, and is specifically calculated as follows:

$$P = m_{SRS,b_{hop}}/m_{SRS,B_{SRS}};$$

$$S = \Pi_{b=0}^{b=b_{hop}} N_b$$

S is a step length related to $b_{hop}$.

The SRS transmission subcarrier offset $k_0$ can be calculated according to the SRS transmission frequency-domain position r, and can be calculated in accordance with the following equation:

$$k_0 = k'_0 + 4 \cdot N_{sc}^{RB} \cdot r$$

wherein, $k'_0$ is an SRS frequency position offset, $N_{sc}^{RB}$ is the number of subcarriers contained in each RB.

Figure 9:
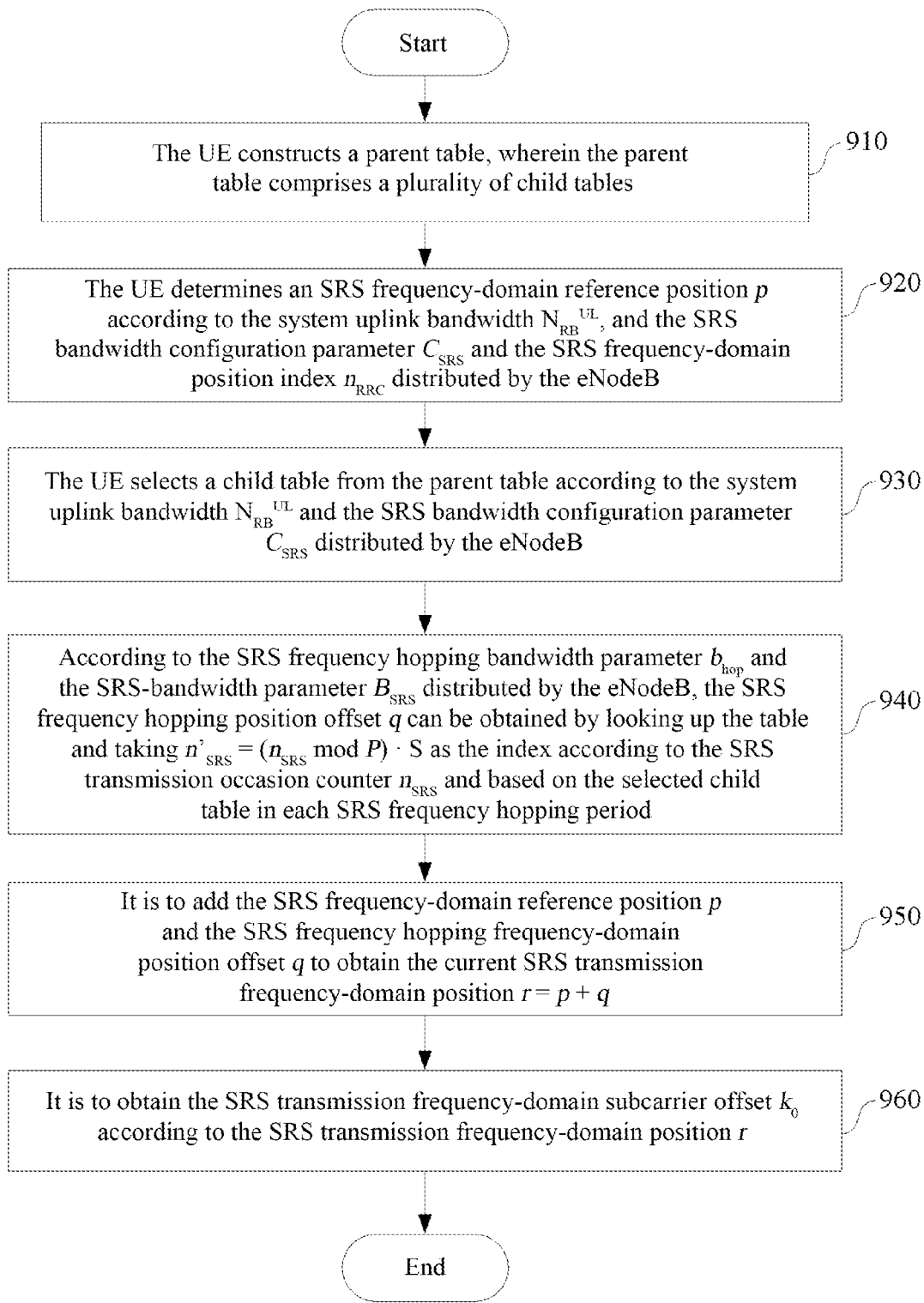
FIG. 9 is another flow chart of the UE using the method for determining the sounding reference signal frequency hopping pattern according to the present document.
Figure 10:
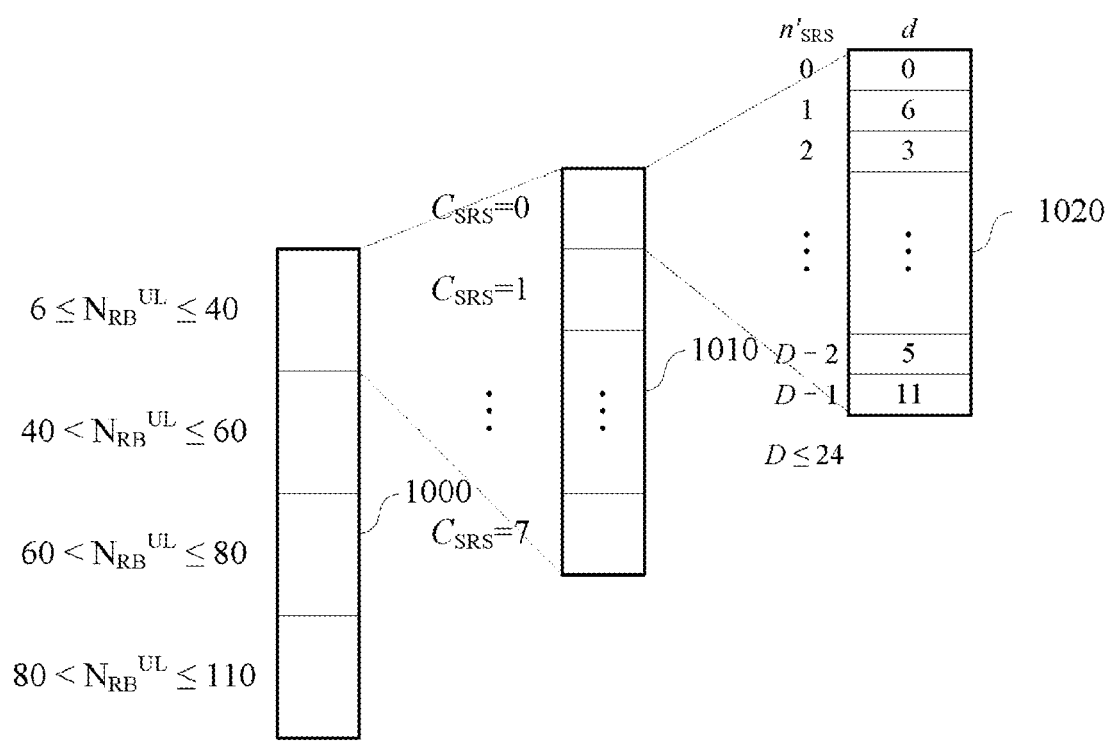
FIG. 10 is a schematic diagram of the structure of another parent table (which comprises a number of child tables).

In the following, in conjunction with FIG. 9 to FIG. 10 as well as FIG. 5 to FIG. 8, the above-mentioned method will be further described in detail, and the process comprises the following steps 910 to 960:

in step 910, the UE constructs a parent table, wherein the parent table comprises a plurality of child tables.

The UE constructs the parent table in advance based on the relevant definitions in the 3GPP TS 36.211 specifications Section 5.5.3.2. See FIG. 10. According to the uplink bandwidth $N_{RB}^{UL}$, the parent table 1000 comprises tables respectively corresponding to the four $N_{RB}^{UL}$ value ranges of $6 \leq N_{RB}^{UL} \leq 40$, $40 < N_{RB}^{UL} \leq 60$, $60 < N_{RB}^{UL} \leq 80$ and $80 < N_{RB}^{UL} \leq 110$. The table 1010 which corresponds to a certain range therein comprises eight tables 1020 respectively corresponding to all possible SRS bandwidth configurations $C_{SRS}$ ($0 \leq C_{SRS} \leq 7$). Each child table 1020 comprises D elements, herein, $D = m_{SRS,0}/4$, where $m_{SRS,0}$ is a positive integer determined based on $N_{RB}^{UL}$ and $C_{SRS}$, its value is a multiple of four and its maximum value is not more than 96, therefore the maximum value of D is not more than 24. Each child table 1020 comprises D SRS frequency hopping pattern frequency-domain position offset values d respectively corresponding to the possible values of each SRS transmission counter $n_{SRS}$ within the frequency hopping period, and the offset value takes 4 RBs as the unit. For example, according to the relevant definitions in the 3GPP TS 36.211 specification Section 5.5.3.2, aiming at all possible combinations of parameters $N_{RB}^{UL}$, $C_{SRS}$ and $n_{RRC}$ in advance, the UE may determine an SRS frequency hopping pattern frequency-domain position offset value by assuming the parameter configuration of $b_{hop} = 0$ and $B_{SRS} = 3$ within one SRS frequency hopping period. The related calculation involves the following equation in the 3GPP TS 36.211 specification section 5.5.3.2:

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ is even} \\ \lfloor N_b/2 \rfloor \left\lfloor n_{SRS} / \prod_{b'=b_{hop}}^{b-1} N_{b'} \right\rfloor & \text{if } N_b \text{ is odd} \end{cases}$$

and $$d(n_{SRS}) = \sum_{b=0}^{B_{SRS}} m_{SRS,b} F_b(n_{SRS})/4$$

Taking into account that the value of d is a non-negative integer not more than D, i.e., its maximum value is not more than 24, so it can be denoted with at most 5 bits, and in order to facilitate the storage of each item, an integer byte should be used for the storage of each item, therefore no more than one byte is needed to store d. Thus, the construction of the relevant parent table 1000 is completed. According to the relevant definitions in the 36.211 specification section 5.5.3.2, the maximum values of $m_{SRS,0}$ do not exceed 36, 48, 72 and 96 respectively corresponding to four kinds of value ranges of $N_{RB}^{UL}$, therefore the numbers of rows D of the corresponding child tables are not more than 9, 12, 18 and 24 respectively. The parent table has a total of 4*8 such child tables, wherein the number of items contained in each child table is not more than D, and the storage of each item is not more than one byte. Thus, the total size of the parent table does not exceed 8*(9+12+18+24)=504 bytes. The UE can store the parent table in ROM or FLASH memory. The size of the child table does not exceed 24 bytes.

In step 920, the UE determines an SRS frequency-domain reference position p according to the system uplink bandwidth $N_{RB}^{UL}$, and the SRS bandwidth configuration parameter $C_{SRS}$ and the SRS frequency-domain position index $n_{RRC}$ distributed by the eNodeB. It can be calculated according to the following equation:

$$p = \lfloor ((4 \cdot n_{RRC}) \bmod m_{SRS,0}/m_{SRS,b_{hop}}) \rfloor \cdot m_{SRS,b_{hop}}/4$$

In the above equation, $\lfloor \ \rfloor$ denotes the rounding down function; mod denotes the modulo operation, $m_{SRS,b_{hop}}$ is determined by the system uplink bandwidth $N_{RB}^{UL}$, and the SRS bandwidth configuration parameter $C_{SRS}$ and the SRS frequency hopping bandwidth parameter $b_{hop}$ distributed by the eNodeB.

The SRS frequency-domain reference position p denotes the starting position of the total bandwidth covered by the frequency hopping pattern, taking 4 RBs as the unit. For example: taking $N_{RB}^{UL} = 100$, $C_{SRS} = 6$ and $B_{SRS} = 1$ as an example, according to the 3GPP TS36.211 specification Section 5.5.3.2, it can be seen that $m_{SRS,0} = 48$, and $m_{SRS,B_{SRS}} = 4$. Assume that the eNodeB configures $n_{RRC} = 6$, it can be calculated that:

$$p = \lfloor ((4 \cdot 6) \bmod 48/4) \rfloor \cdot 4/4 = 6$$

In step 930, the UE selects a child table from the parent table according to the system uplink bandwidth $N_{RB}^{UL}$ and the SRS bandwidth configuration parameter $C_{SRS}$ distributed by the eNodeB.

After accessing to the network and reading the system message and cell common configuration distributed by the eNodeB, the UE can obtain the uplink bandwidth $N_{RB}^{UL}$ and the SRS bandwidth configuration parameter $C_{SRS}$; for example, taking $N_{RB}^{UL} = 100$ and $C_{SRS} = 6$ as an example, the child table is selected according to $N_{RB}^{UL} = 100$ and $C_{SRS} = 6$ in the parent table. The UE may load the selected child table from the ROM or FLASH into the DBB chip so that it can be accessed quickly. Since the size of the child table does not exceed 24 bytes, the overhead after loading into a DBB chip is very small.

In step 940, according to the SRS frequency hopping bandwidth parameter $b_{hop}$ and the SRS-bandwidth parameter $B_{SRS}$ distributed by the eNodeB, the SRS frequency hopping position offset q can be obtained by looking up the table and taking $n'_{SRS} = (n_{SRS} \bmod P) \cdot S$ as the index according to the SRS transmission occasion counter $n_{SRS}$ and based on the selected child table in each SRS frequency hopping period.

The UE reads the SRS frequency hopping bandwidth parameter $b_{hop}$ in the specific configuration distributed by the eNodeB, then compares it with the parameter $B_{SRS}$ to determine whether the eNodeB enables the SRS frequency hopping. If $b_{hop} \geq B_{SRS}$, the eNodeB does not enable the SRS frequency hopping, at this time, the UE can directly determine the SRS transmission frequency-domain position according to the SRS frequency-domain reference position p obtained from the calculation in the second step 1020. If $b_{hop} < B_{SRS}$, the eNodeB enables the SRS frequency hopping, and the UE determines the index for looking up the child table, $n'_{SRS} = (n_{SRS} \bmod P) \cdot S$ according to SRS transmission occasion counter $n_{SRS}$ as well as the parameter $b_{hop}$. Wherein, the SRS frequency hopping period P is determined by the parameters $b_{hop}$ and $B_{SRS}$ together, $P = m_{SRS,b_{hop}} / m_{SRS,B_{SRS}}$, and the P value does not exceed the number of rows D in the child table. When $b_{hop} = 0$, $P = D$ is the number of rows in the child table, it is to select the step length $S = N_0 = 1$; when $b_{hop} > 0$, the child table's "nested" feature can be used, the child table is still used to look up the table, but the step length is modified to $S = \Pi_{b=0}^{b=b_{hop}} N_b$. From the process of looking up the table, the parameter S represents the step length between indexes for continuously looking up the table; while the parameter P represents taking S as the step length, and only the first P items in the table are taken, and it is to return back to the $0^{th}$ index after exceeding this range.

One example can refer to FIG. 5, the example assumes that $B_{SRS} = 3$. Assume that the parameter configured by the eNodeB $b_{hop} = 1$, according to the 3GPP specification TS36.211 Section 5.5.3.2, it can be seen that $m_{SRS,b_{hop}} = 24$ and $m_{SRS,B_{SRS}} = 4$, then it can determine that the period $P = 24/4 = 6$; in addition, according to the 3GPP TS36.211 specification Section 5.5.3.2, it also can be seen that $N_0 = 1$ and $N_1 = 2$, it can calculate to obtain the step length $S = 1*2 = 2$. Thus, it is to look up the table according to $n'_{SRS} = (n_{SRS} \bmod 6) \cdot 2$, and the $0^{th}$, $2^{nd}$, $4^{th}$, $6^{th}$, $8^{th}$ and $10^{th}$ items in the table can be taken based on all possible values of $n_{SRS}$, as shown by the box with diagonal stripes in FIG. 5.

Another example can refer to FIG. 6, the example assumes that $b_{hop} = 0$. Assume that the parameter configured by the eNodeB $B_{SRS} = 2$, according to the 3GPP specification TS36.211 Section 5.5.3.2, it can be seen that $m_{SRS,b_{hop}} = 48$ and $m_{SRS,B_{SRS}} = 12$, then it can determine that the period $P = 48/12 = 4$; in addition, according to the 3GPP TS36.211 specification Section 5.5.3.2, it also can be seen that $N_0 = 1$, and it can calculate to obtain the step length $S = 1$. Thus, it is to look up the table according to $n'_{SRS} = (n_{SRS} \bmod 4) \cdot 1$, and the $0^{th}$, $1^{st}$, $2^{nd}$ and $3^{rd}$ items in the table can be taken based on all possible values of $n_{SRS}$, as shown by the box with diagonal stripes in FIG. 6.

Still another example can refer to FIG. 7, the example assumes that $b_{hop} = 0$ and $B_{SRS} = 2$. According to the 3GPP specification TS36.211 Section 5.5.3.2, it can be seen that $m_{SRS,b_{hop}} = 24$ and $m_{SRS,B_{SRS}} = 12$, then it can determine that the period $P = 24/12 = 2$; in addition, according to the 3GPP TS36.211 specification Section 5.5.3.2, it also can be seen that $N_0 = 1$ and $N_1 = 2$, and it can calculate to obtain the step length $S = 1*2 = 2$. Thus, it is to look up the table according to $n'_{SRS} = (n_{SRS} \bmod 2) \cdot 2$, and the $0^{th}$ and $2^{nd}$ items in the table can be taken based on all possible values of $n_{SRS}$, as shown by the box with diagonal stripes in FIG. 7.

Thereafter, based on the child table selected in the third step 1030, it is to take $n'_{SRS}$ as an index, look up the child table to obtain the corresponding d value, and assign the d value to q, so as to determine the SRS frequency hopping frequency-domain position offset q.

In step 950, it is to add the SRS frequency-domain reference position p and the SRS frequency hopping frequency-domain position offset q to obtain the current SRS transmission frequency-domain position $r = p + q$.

Herein, the unit of the frequency-domain position is 4 RBs. See the example in FIG. 8, assume that $b_{hop} = 1$, $B_{SRS} = 3$ and $n_{RRC} = 6$, the black box in the figure represents that the SRS is transmitted at the corresponding frequency-domain position, and the white box represents the SRS is not transmitted. Wherein, the SRS frequency-domain reference position p is obtained through the second step 920, while the SRS frequency hopping frequency-domain position offset q is obtained through the fourth step 940. In FIG. 6, $p = 6$, and the q values can be obtained by looking up the table in one SRS frequency hopping period, sequentially 0, 3, 1, 4, 2, 5, and by adding the two parties together, the SRS transmission frequency-domain positions: 6+0=6, 6+3=9, 6+1=7, 6+4=10, 6+2=8, 6+5=11 within one SRS frequency hopping period can be obtained, herein the frequency-domain position takes four RBs as the unit.

In step 960, it is to obtain the SRS transmission frequency-domain subcarrier offset $k_0$ according to the SRS transmission frequency-domain position r.

The SRS transmission subcarrier offset $k_0$ can be obtained according to the SRS transmission frequency-domain position r, and it can be calculated according to the following equation: $k_0 = k'_0 + 4 \cdot N_{sc}^{RB} \cdot r$, where $k'_0$ is an SRS frequency position offset, $N_{sc}^{RB}$ denotes the number of subcarriers contained in each RB, in the LTE system, $N_{sc}^{RB} = 12$, i.e., one RB comprises 12 subcarriers. Herein, since the SRS frequency-domain position r calculated in the fifth step 350 takes 4 RBs as the unit, it needs to be multiplied by $4 \cdot N_{sc}^{RB}$ to be converted into the subcarrier. And $k'_0$ is an SRS transmission sub-carrier offset value, for example, according to the 3GPP TS36.211 Specifications Section 5.5.3.2, it is calculated according to the following equation in the conventional subframe:

$$k'_0 = (\lfloor N_{RB}^{UL}/2 \rfloor - m_{SRS,0}/2) N_{sc}^{RB} + k_{TC}$$

Wherein the value of the parameter $k_{TC}$ is equal to 0 or 1, which is indicated to the UE by the eNodeB in the specific configuration Thus, for the case of SRS frequency hopping, the processing steps 910 to 960 are repeated for P times in one SRS frequency hopping period to obtain the SRS frequency hopping pattern. Wherein, step 910, that is, constructing the table, can be pre-performed, while step 920 may be performed after reading the eNodeB-common configuration and the UE-specific configuration, therefore the steps 910 and 920 do not need to be performed repeatedly.

Through the above-mentioned preferred embodiment, it can be seen that, compared with the prior art, using the solution and device of the present document can reduce the computational complexity of the process of the UE determining the SRS frequency hopping pattern through the method of looking up the table, which can save the UE power or reduce the UE cost.

The Third Embodiment

The present embodiment provides a device, e.g., a user equipment, for determining a sounding reference signal frequency hopping pattern, to realize the method of the above-mentioned first embodiment. The system comprises at least:

a first unit, used to: construct a parent table, wherein the constructed parent table contains a plurality of child tables, wherein, each value combination of a bandwidth configuration parameter ($C_{SRS}$) and an $n'_{RRC}$ value corresponds to a child table;

it should be noted that, the first unit is used to: make the child table in the constructed parent table comprise D= $m_{SRS,0}/4$ rows, respectively corresponding to all SRS transmission occasions within one SRS frequency hopping period when $b_{hop}=0$ and $B_{SRS}=3$, wherein, $m_{SRS,0}$ is determined by the system uplink bandwidth $N_{RB}^{UL}$ and the SRS bandwidth configuration parameters $C_{SRS}$ distributed by the eNodeB; in the child table, each row comprises a non-negative integer d.

Wherein, the value of d can be calculated in accordance with the following equation:

$$d = \sum_{b=0}^{B_{SRS}} m_{SRS,b} n_b / 4$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}, (b = 0, 1, 2, 3)$$

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} + \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ is even} \\ \lfloor N_b/2 \rfloor \lfloor n_{SRS} / \prod_{b'=b_{hop}}^{b-1} N_{b'} \rfloor & \text{if } N_b \text{ is odd} \end{cases}$$

Preferably, the first unit can also store the constructed parent table, and the parent table comprises all possible combinations corresponding to parameters $N_{RB}^{UL}$, $C_{SRS}$ and $n'_{RRC}$ in turn, wherein, $n'_{RRC} = n_{RRC} \bmod (m_{SRS,b_{hop}}/4)$.

A second unit, used to: determine an SRS frequency-domain reference position p according to the system uplink bandwidth $N_{RB}^{UL}$, and the SRS bandwidth configuration parameter $C_{SRS}$, the SRS frequency-domain position index $n_{RRC}$ and the SRS frequency hopping bandwidth parameter $b_{hop}$ distributed by an eNodeB;

Specifically, the second unit can calculate the SRS transmission frequency-domain reference position p according to the following equation:

$$p = \lfloor ((4 \cdot n_{RRC}) \bmod m_{SRS,0}/m_{SRS,b_{hop}}) \rfloor \cdot m_{SRS,b_{hop}}/4$$

In the above equation, $\lfloor \rfloor$ denotes the rounding down function; mod denotes the modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $b_{hop}$ distributed by the eNodeB.

A third unit, used to: calculate another $n'_{RRC}$ according to the system uplink bandwidth $N_{RB}^{UL}$, the SRS bandwidth configuration parameter $C_{SRS}$ distributed by the eNodeB, and based on the SRS frequency-domain position index $n_{RRC}$, and select a child table from the constructed parent table according to the obtained $n'_{RRC}$; and look up the table to obtain an SRS frequency hopping frequency-domain position offset q by taking $n'_{SRS} = (n_{SRS} \bmod P) \cdot S$ as an index according to the SRS transmission occasion counter $n_{SRS}$ and based on the selected child table in each SRS frequency hopping period according to the SRS frequency hopping bandwidth parameter $b_{hop}$ and the SRS bandwidth parameter $B_{SRS}$ distributed by an eNodeB; add the SRS frequency-domain reference position p and the SRS frequency hopping frequency-domain position offset q to obtain a current SRS transmission frequency-domain position r=p+q; calculate an SRS transmission frequency-domain subcarrier offset $k_0$ according to the SRS transmission frequency-domain position r, and repeat the above-mentioned processing steps for P times within one SRS frequency hopping period to obtain an SRS frequency hopping pattern, wherein, a value of P is determined based on $b_{hop}$ and $B_{SRS}$ together.

Wherein, the third unit determines the value of P according to the following equation:

$$P = m_{SRS,b_{hop}}/m_{SRS,B_{SRS}};$$

$$S = \Pi_{b=0}^{b=b_{hop}} N_b,$$

and the subcarrier offset $k_0$ can be calculate in accordance with the following equation:

$$k_0 = k'_0 + 4 \cdot N_{sc}^{RB} \cdot r$$

wherein, $k'_0$ is an SRS frequency position offset, and $N_{sc}^{RB}$ is the number of subcarriers contained in each RB.

The Fourth Embodiment

The present document provides a device, such as a user equipment, for determining a sounding reference signal (SRS) frequency hopping pattern, which can implement the method of the above-mentioned second embodiment. In the present embodiment, the device at least comprises the following three units.

A first unit, used to construct a parent table, wherein the constructed parent table contains a plurality of child tables;

It should be noted that, the child table in the parent table constructed by the first unit comprises $D=m_{SRS,0}/4$ rows, respectively corresponding to all SRS transmission occasions within one SRS frequency hopping period when $b_{hop}=0$ and $B_{SRS}=3$, wherein, $m_{SRS,0}$ is determined by the system uplink bandwidth $N_{RB}^{UL}$ and the SRS bandwidth configuration parameters $C_{SRS}$ distributed by the eNodeB; in the child table, each row comprises a non-negative integer d, wherein, the value of d is calculated in accordance with the following equation:

$$d(n_{SRS}) = \sum_{b=0}^{B_{SRS}} m_{SRS,b} F_b(n_{SRS}) / 4$$

wherein $$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} + \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ is even} \\ \lfloor N_b/2 \rfloor \lfloor n_{SRS} / \prod_{b'=b_{hop}}^{b-1} N_{b'} \rfloor & \text{if } N_b \text{ is odd} \end{cases}$$

A second unit, used to determine an SRS frequency-domain reference position p according to the system uplink bandwidth $N_{RB}^{UL}$, and the SRS bandwidth configuration parameter $C_{SRS}$ and the SRS frequency-domain position index $n_{RRC}$ distributed by an eNodeB;

In the above-mentioned embodiment, the second unit calculates an SRS transmission frequency-domain reference position p according to the following equation:

$$p = \lfloor ((4 \cdot n_{RRC}) \bmod m_{SRS,0}/m_{SRS,b_{hop}}) \rfloor \cdot m_{SRS,b_{hop}}/4$$

In the above equation, $\lfloor\ \rfloor$ denotes the rounding down function; mod denotes the modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $b_{hop}$ distributed by the eNodeB.

While the second unit can determine the SRS frequency hopping period P according to the parameters $b_{hop}$ and $B_{SRS}$ together according to the following equation:

$$P=m_{SRS,b_{hop}}/m_{SRS,B_{SRS}};$$

$$S=\Pi_{b=0}^{b=b_{hop}}N_b.$$

S is a step length related to the $b_{hop}$.

The third unit selects a child table from the parent table according to the system uplink bandwidth $N_{RB}^{UL}$ and the SRS bandwidth configuration parameter $C_{SRS}$ distributed by the eNodeB, and looks up the table to obtain an SRS frequency hopping frequency-domain position offset q by taking $n'_{SRS}=(n_{SRS} \bmod P)\cdot S$ as an index according to the SRS transmission occasion counter $n_{SRS}$ and based on the selected child table in each SRS frequency hopping period according to the SRS frequency hopping bandwidth parameter $b_{hop}$ and the SRS bandwidth parameter $B_{SRS}$ distributed by the eNodeB, and adds the SRS frequency-domain reference position p and the SRS frequency hopping frequency-domain position offset q to obtain a current SRS transmission frequency-domain position r=p+q, and calculates the SRS transmission frequency-domain subcarrier offset $k_0$ according to the SRS transmission frequency-domain position r, and repeats the above-mentioned processing steps for P times within one SRS frequency hopping period to obtain an SRS frequency hopping pattern.

Specifically, the third unit calculates the SRS transmission subcarrier offset $k_0$ in accordance with the SRS transmission frequency-domain position r, and calculates according to the following equation:

$$k_0=k'_0+4\cdot N_{sc}^{RB}\cdot r,$$

wherein, $k'_0$ is an SRS frequency position offset, $N_{sc}^{RB}$ is the number of subcarriers included in each RB.

Those ordinarily skilled in the art can understand that all or some of steps of the above-mentioned method may be completed by the programs instructing the relevant hardware, and the programs may be stored in a computer-readable storage medium, such as read only memory, magnetic or optical disk. Alternatively, all or some of the steps of the above-mentioned embodiments may also be implemented by using one or more integrated circuits. Accordingly, each module/unit in the above-mentioned embodiments may be realized in a form of hardware, or in a form of software function modules. The present application is not limited to any specific form of hardware and software combinations.

The above description is only preferred embodiments of the present document and is not used to limit the protection scope of the present document. Any changes, equivalent replacements and improvements made within the spirit and principle of the present document should be included within the protection scope of the present document.

INDUSTRIAL APPLICABILITY

The above-mentioned solution reduces the computational complexity of the process of the UE determining an SRS frequency hopping pattern through the method of looking up the table, so as to achieve the objective of saving the UE power or reducing the UE costs.

What is claimed is:

1. A method for determining a sounding reference signal (SRS) frequency hopping pattern, comprising:
   a user equipment (UE) constructing a parent table, wherein the constructed parent table contains a plurality of child tables, wherein, each value combination of an SRS bandwidth configuration parameter ($C_{SRS}$) and a calculated SRS frequency-domain position index $n'_{RRC}$ corresponds to a child table;
   the UE determining an SRS frequency-domain reference position p according to a system uplink bandwidth $N_{RB}^{UL}$, the SRS bandwidth configuration parameter $C_{SRS}$, an SRS frequency-domain position index $n_{RRC}$ and an SRS frequency hopping bandwidth parameter $b_{hop}$ distributed by an eNodeB;
   the UE calculating another $n'_{RRC}$ according to the system uplink bandwidth $N_{RB}^{UL}$, the SRS bandwidth configuration parameter $C_{SRS}$ distributed by the eNodeB, and based on the SRS frequency-domain position index $n_{RRC}$, selecting a child table from the constructed parent table according to the obtained $n'_{RRC}$;
   the UE obtaining an SRS frequency hopping frequency-domain position offset q by looking up the selected child table and taking $n'_{SRS}=(n_{SRS} \bmod P)\cdot S$ as an index, according to an SRS transmission occasion counter $n_{SRS}$ and based on the selected child table, in each SRS frequency hopping period, according to the SRS frequency hopping bandwidth parameter $b_{hop}$ and an SRS bandwidth parameter $B_{SRS}$ distributed by the eNodeB;
   adding the SRS frequency-domain reference position p and the SRS frequency hopping frequency-domain position offset q to obtain a current SRS transmission frequency-domain position r=p+q;
   calculating an SRS transmission frequency-domain subcarrier offset $k_0$ according to the current SRS transmission frequency-domain position r;
   repeating the above-mentioned processing steps for P times within one SRS frequency hopping period to obtain an SRS frequency hopping pattern, wherein, a value of P is determined based on $b_{hop}$ and $B_{SRS}$ together, and S is a step length related to $b_{hop}$.

2. The method of claim 1, wherein,
   an SRS transmission frequency-domain reference position p is calculated according to the following equation:

$$p=\lfloor((4\cdot n_{RRC})\bmod m_{SRS,0}/m_{SRS,b_{hop}})\rfloor\cdot m_{SRS,b_{hop}}/4$$

In the above equation, $\lfloor\ \rfloor$ denotes a rounding down function; mod denotes a modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $b_{hop}$ distributed by the eNodeB, wherein m is the number of resource blocks contained in a bandwidth of the layer designated by the associated sub-variable.

3. The method of claim 1, wherein,
   the child table in the constructed parent table comprises $D=m_{SRS,0}/4$ rows, respectively corresponding to all SRS transmission occasions within one SRS frequency hopping period when $b_{hop}=0$ and $B_{SRS}=3$, wherein, $M_{SRS,0}$ is determined by the system uplink bandwidth $N_{RB}^{UL}$ and the SRS bandwidth configuration parameter $C_{SRS}$ distributed by the eNodeB; wherein m is the number of resource blocks contained in a bandwidth of the layer designated by the associated sub-variable; and in the child table, each row comprises a non-negative integer d, where a value range of d is 0≤d<D.

4. The method of claim 3, wherein,
the value of d in the child table is determined in accordance with the following equation:

$$d = \sum_{b=0}^{B_{SRS}} m_{SRS,b} n_b / 4$$

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}, (b = 0, 1, 2, 3)$$

$$F_b(n_{SRS}) = \begin{cases} (N_b/2) \left[ \frac{n_{SRS} \bmod \prod_{b'=b_{hop}}^{b} N_{b'}}{\prod_{b'=b_{hop}}^{b-1} N_{b'}} + \frac{n_{SRS} \bmod \prod_{b'=b_{hop}}^{b} N_{b'}}{2\prod_{b'=b_{hop}}^{b-1} N_{b'}} \right] & \text{if } N_b \text{ is even} \\ \lfloor N_b/2 \rfloor \left\lfloor n_{SRS} / \prod_{b'=b_{hop}}^{b-1} N_{b'} \right\rfloor & \text{if } N_b \text{ is odd} \end{cases}$$

wherein, b represents a layer, $N_b$ represents the number of branch nodes at a $b^{th}$ layer, Fb(nSRS) is the SRS frequency hop pattern frequency-domain offset, b' represent a value within the range from $b_{hop}$ to b, Nb' represents the number of branch nodes located in the $b^{th}$ layer and contained in the $(b'-1)^{th}$ layer nodes, mod denotes a modulo operation, ⌊ ⌋ denotes a rounding down operation, and Π denotes a series multiplication.

5. The method of claim 1, wherein,
values of P and S are determined according to the following equations, wherein m is the number of resource blocks contained in a bandwidth of the layer designated by the associated sub-variable, b represents a layer, $N_b$ represents the number of branch nodes at a $b^{th}$ layer:

$$P = m_{SRS,b_{hop}}/m_{SRS,B_{SRS}};$$

$$S = \Pi_{b=0}^{b=b_{hop}} N_b.$$

6. The method of claim 1, wherein,
the method further comprises:
the UE storing the constructed parent table, wherein the parent table comprises all possible combinations corresponding to parameters $N_{RB}^{UL}$, $C_{SRS}$ and $n'_{RRC}$ in turn, wherein, $n'_{RRC} = n_{RRC} \bmod (m_{SRS,b_{hop}}/4)$; wherein m is the number of resource blocks contained in a bandwidth of the layer designated by the associated sub-variable.

7. The method of claim 1, wherein,
the subcarrier offset $k_0$ is calculated in accordance with the following equation:

$$k_0 = k'_0 + 4 \cdot N_{sc}^{RB} \cdot r$$

wherein, $k'_0$ is an SRS frequency position offset, $N_{sc}^{RB}$ is a number of subcarriers included in each resource block RB.

8. A device for determining a sounding reference signal frequency hopping pattern, comprising:
a first unit, configured to: construct a parent table, wherein the constructed parent table contains a plurality of child tables, wherein, each value combination of an SRS bandwidth configuration parameter ($C_{SRS}$) and a calculated SRS frequency-domain position index $n'_{RRC}$ corresponds to a child table;

a second unit, configured to: determine an SRS frequency-domain reference position p according to a system uplink bandwidth $N_{RB}^{UL}$, the SRS bandwidth configuration parameter $C_{SRS}$, an SRS frequency-domain position index $n_{RRC}$ and an SRS frequency hopping bandwidth parameter $b_{hop}$ distributed by an eNodeB;

a third unit, configured to: calculate another $n'_{RRC}$ according to the system uplink bandwidth $N_{RB}^{UL}$, the SRS bandwidth configuration parameter $C_{SRS}$ distributed by the eNodeB, and based on the SRS frequency-domain position index $n_{RRC}$, select a child table from the constructed parent table according to the obtained $n'_{RRC}$; and look up the selected child table to obtain an SRS frequency hopping frequency-domain position offset q by taking $n'_{SRS} = (n_{SRS} \bmod P) \cdot S$ as an index according to an SRS transmission occasion counter $n_{SRS}$ and based on the selected child table in each SRS frequency hopping period according to the SRS frequency hopping bandwidth parameter $b_{hop}$ and an SRS bandwidth parameter $B_{SRS}$ distributed by the eNodeB; add the SRS frequency-domain reference position p and the SRS frequency hopping frequency-domain position offset q to obtain a current SRS transmission frequency-domain position r=p+q; calculate an SRS transmission frequency-domain subcarrier offset $k_0$ according to the current SRS transmission frequency-domain position r, and repeat the above-mentioned processing steps for P times within one SRS frequency hopping period to obtain an SRS frequency hopping pattern, wherein, a value of P is determined based on $b_{hop}$ and $B_{SRS}$ together, and S is a step length related to $b_{hop}$.

9. The device of claim 8, wherein,
the second unit is configured to: calculate an SRS transmission frequency-domain reference position p according to the following equation:

$$p = \lfloor ((4 \cdot n_{RRC}) \bmod m_{SRS,0}/m_{SRS,b_{hop}}) \rfloor \cdot m_{SRS,b_{hop}}/4$$

in the above equation, ⌊ ⌋ denotes a rounding down function; mod denotes a modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $b_{hop}$ distributed by the eNodeB, wherein m is the number of resource blocks contained in a bandwidth of the layer designated by the associated sub-variable.

10. The device of claim 8, wherein,
the first unit is configured to: make the child table in the constructed parent table comprise $D = m_{SRS,0}/4$ rows, respectively corresponding to all SRS transmission occasions within one SRS frequency hopping period when $b_{hop} = 0$ and $B_{SRS} = 3$, wherein, $m_{SRS,0}$ is determined by the system uplink bandwidth $N_{RB}^{UL}$ and the SRS bandwidth configuration parameters $C_{SRS}$ distributed by the eNodeB; wherein m is the number of resource blocks contained in a bandwidth of the layer designated by the associated sub-variable; and in the child table, each row comprises a non-negative integer d, where a value range of d is 0≤d<D.

11. The device of claim 10, wherein,
the first unit is configured to: when constructing the parent table, determine the value of d in the child table in accordance with the following equation:

$$d = \sum_{b=0}^{B_{SRS}} m_{SRS,b} n_b / 4$$

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}, (b=0,1,2,3)$$

$$F_b(n_{SRS}) =$$

$$\begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ is even} \\ \lfloor N_b/2 \rfloor \left\lfloor n_{SRS} / \prod_{b'=b_{hop}}^{b-1} N_{b'} \right\rfloor & \text{if } N_b \text{ is odd} \end{cases}$$

wherein, b represents a layer, $N_b$ represents the number of branch nodes at a $b^{th}$ layer, Fb(nSRS) is the SRS frequency hop pattern frequency-domain offset, b' represent a value within the range from $b_{hop}$ to b, Nb' represents the number of branch nodes located in the $b'^{th}$ layer and contained in the $(b'-1)^{th}$ layer nodes, mod denotes a modulo operation, $\lfloor \; \rfloor$ denotes a rounding down operation, and $\Pi$ denotes a series multiplication.

12. The device of claim 8, wherein,
the third unit is configured to: determine values of P and S according to the following equations, wherein m is the number of resource blocks contained in a bandwidth of the layer designated by the associated sub-variable, b represents a layer, $N_b$ represents the number of branch nodes at a $b^{th}$ layer:

$$P = m_{SRS,b_{hop}}/m_{SRS,B_{SRS}};$$

$$S = \Pi_{b=0}^{b=b_{hop}} N_b.$$

13. The device of claim 8, wherein,
the first unit is further configured to: store the constructed parent table, wherein the parent table comprises all possible combinations corresponding to parameters $N_{RB}^{UL}$, $C_{SRS}$ and $n'_{RRC}$ in turn, wherein, $n'_{RRC} = n_{RRC} \bmod (m_{SRS,b_{hop}}/4)$; wherein m is the number of resource blocks contained in a bandwidth of the layer designated by the associated sub-variable.

14. The device of claim 8, wherein,
the third unit is configured to: calculate the subcarrier offset $k_0$ in accordance with the following equation:

$$k_0 = k'_0 + 4 \cdot N_{sc}^{RB} \cdot r$$

wherein, $k'_0$ is an SRS frequency position offset, $N_{sc}^{RB}$ is a number of subcarriers included in each resource block RB.

15. A method for determining a sounding reference signal (SRS) frequency hopping pattern, comprising the following steps:
a user equipment (UE) constructing a parent table, wherein the constructed parent table contains a plurality of child tables;
the UE determining an SRS frequency-domain reference position p according to a system uplink bandwidth $N_{RB}^{UL}$, and an SRS bandwidth configuration parameter $C_{SRS}$ and an SRS frequency-domain position index $n_{RRC}$ distributed by an eNodeB;
the UE selecting a child table from the constructed parent table according to the system uplink bandwidth $N_{RB}^{UL}$, and the SRS bandwidth configuration parameter $C_{SRS}$ distributed by the eNodeB;
the UE looking up the elected child table to obtain an SRS frequency hopping frequency-domain position offset q by taking $n'_{SRS} = (n_{SRS} \bmod P) \cdot S$ as an index, according to an SRS transmission occasion counter $n_{SRS}$ and based on the selected child table, in each SRS frequency hopping period, according to the SRS frequency hopping bandwidth parameter $b_{hop}$ and an SRS bandwidth parameter $B_{SRS}$ distributed by the eNodeB;
adding the SRS frequency-domain reference position p and the SRS frequency hopping frequency-domain position offset q to obtain a current SRS transmission frequency-domain position r=p+q;
calculating an SRS transmission frequency-domain sub-carrier offset $k_0$ according to the current SRS transmission frequency-domain position r,
repeating the above-mentioned processing steps for P times within one SRS frequency hopping period to obtain an SRS frequency hopping pattern, wherein, a value of P is determined based on $b_{hop}$ and $B_{SRS}$ together, and S is a step length related to $b_{hop}$.

16. The method of claim 15, wherein,
an SRS transmission frequency-domain reference position p is calculated according to the following equation:

$$p = \lfloor ((4 \cdot n_{RRC}) \bmod m_{SRS,0}/m_{SRS,b_{hop}}) \rfloor \cdot m_{SRS,b_{hop}}/4$$

in the above equation, $\lfloor \; \rfloor$ denotes a rounding down function; mod denotes a modulo operation, $m_{SRS,b_{hop}}$ is determined by the system uplink bandwidth $N_{RB}^{UL}$, the SRS bandwidth configuration parameter $C_{SRS}$ and the SRS bandwidth parameter $B_{SRS}$ distributed by the eNodeB, wherein m is the number of resource blocks contained in a bandwidth of the layer designated by the associated sub-variable.

17. The method of claim 15, wherein,
the child table comprises $D = m_{SRS,0}/4$ rows, respectively corresponding to all SRS transmission occasions within one SRS frequency hopping period when $b_{hop} = 0$ and $B_{SRS} = 3$, wherein, $m_{SRS,0}$ is determined by the system uplink bandwidth $N_{RB}^{UL}$ and the SRS bandwidth configuration parameter $C_{SRS}$ distributed by the eNodeB; wherein m is the number of resource blocks contained in a bandwidth of the layer designated by the associated sub-variable, b represents a layer, $N_b$ represents the number of branch nodes at a $b^{th}$ layer, Fb(nSRS) is the SRS frequency hop pattern frequency-domain offset, b' represent a value within the range from $b_{hop}$ to b, Nb' represents the number of branch nodes located in the $b'^{th}$ layer and contained in the $(b'-1)^{th}$ layer nodes, mod denotes a modulo operation, $\lfloor \; \rfloor$ denotes a rounding down operation, and $\Pi$ denotes a series multiplication; in the child table, each row comprises a non-negative integer d, where d is calculated according to the following equation:

$$d(n_{SRS}) = \sum_{b=0}^{B_{SRS}} m_{SRS,b} F_b(n_{SRS})/4$$

wherein, $$F_b(n_{SRS}) =$$

$$\begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ is even} \\ \lfloor N_b/2 \rfloor \left\lfloor n_{SRS} / \prod_{b'=b_{hop}}^{b-1} N_{b'} \right\rfloor & \text{if } N_b \text{ is odd} \end{cases}$$

18. The method of claim 15, wherein,
values of P and S are determined according to the following equation:

$P = m_{SRS,b_{hop}} / m_{SRS,B_{SRS}};$ $S = \Pi_{b=0}^{b=b_{hop}} N_b,$ or, wherein, the SRS transmission subcarrier offset $k_0$ is calculated according to the SRS transmission frequency-domain position r, and can be calculated in accordance with the following equation: $k_0 = k'_0 + 4 \cdot N_{sc}^{RB} \cdot r$, where $k'_0$ is an SRS frequency position offset, and $N_{sc}^{RB}$ is a number of subcarriers included in each resource block RB; wherein m is the number of resource blocks contained in a bandwidth of the layer designated by the associated sub-variable, b represents a layer, $N_b$ represents the number of branch nodes at a $b^{th}$ layer, Fb(nSRS) is the SRS frequency hop pattern frequency-domain offset, mod denotes a modulo operation, and $\Pi$ denotes a series multiplication.

19. A device for determining a sounding reference signal (SRS) frequency hopping pattern, comprising:

a first unit, configured to: construct a parent table, wherein the constructed parent table contains a plurality of child tables;

a second unit, configured to: determine an SRS frequency-domain reference position p according to a system uplink bandwidth $N_{RB}^{UL}$, and an SRS bandwidth configuration parameter $C_{SRS}$ and an SRS frequency-domain position index $n_{RRC}$ distributed by an eNodeB;

a third unit, configured to: select a child table from the parent table according to the system uplink bandwidth $N_{RB}^{UL}$ and the SRS bandwidth configuration parameter $C_{SRS}$ distributed by the eNodeB, and look up the selected child table to obtain an SRS frequency hopping frequency-domain position offset q by taking $n'_{SRS} = (n_{SRS} \mod P) \cdot S$ as an index according to an SRS transmission occasion counter $n_{SRS}$ and based on the selected child table in each SRS frequency hopping period according to the SRS frequency hopping bandwidth parameter $b_{hop}$ and an SRS bandwidth parameter $B_{SRS}$ distributed by the eNodeB; add the SRS frequency-domain reference position p and the SRS frequency hopping frequency-domain position offset q to obtain a current SRS transmission frequency-domain position $r = p + q$, calculate an SRS transmission frequency-domain subcarrier offset $k_0$ according to the current SRS transmission frequency-domain position r, and repeat the above-mentioned processing steps for P times within one SRS frequency hopping period to obtain an SRS frequency hopping pattern, wherein, a value of P is determined based on $b_{hop}$ and $B_{SRS}$ together, and S is a step length related to $b_{hop}$.

20. The device of claim 19, wherein, the second unit is configured to: calculate an SRS transmission frequency-domain reference position p according to the following equation:

$p = \lfloor ((4 \cdot n_{RRC}) \mod m_{SRS,0} / m_{SRS,b_{hop}}) \rfloor \cdot m_{SRS,b_{hop}} / 4$ in the above equation, $\lfloor \ \rfloor$ denotes a rounding down function; mod denotes a modulo operation, $m_{SRS,b_{hop}}$ is determined by the system uplink bandwidth $N_{RB}^{UL}$, the SRS bandwidth configuration parameter $C_{SRS}$ and the SRS frequency hopping bandwidth parameter $B_{SRS}$ distributed by the eNodeB, or, wherein, the first unit is configured to, make the child table in the constructed parent table comprise $D = m_{SRS,0}/4$ rows respectively corresponding to all SRS transmission occasions within one SRS frequency hopping period when $b_{hop} = 0$ and $B_{SRS} = 3$, wherein, $m_{SRS,0}$ is determined b the s stem uplink bandwidth $N_{RB}^{UL}$ and the SRS bandwidth configuration parameter $C_{SRS}$ distributed b the eNodeB; in the child table, each row comprises a non-negative integer d, wherein, d is calculated in accordance with the following equation:

$$d(n_{SRS}) = \sum_{b=0}^{B_{SRS}} m_{SRS,b} F_b(n_{SRS})/4$$

wherein $F_b(n_{SRS}) =$ $$\begin{cases} (N_b/2) \left[ \dfrac{n_{SRS} \bmod \prod_{b'=b_{hop}}^{b} N_{b'}}{\prod_{b'=b_{hop}}^{b-1} N_{b'}} + \dfrac{n_{SRS} \bmod \prod_{b'=b_{hop}}^{b} N_{b'}}{2 \prod_{b'=b_{hop}}^{b-1} N_{b'}} \right] & \text{if } N_b \text{ is even} \\ \lfloor N_b/2 \rfloor \left[ n_{SRS} \Big/ \prod_{b'=b_{hop}}^{b-1} N_{b'} \right] & \text{if } N_b \text{ is odd} \end{cases}$$

or, wherein, the second unit is configured to determine values of P and S according to the following equation:

$P = m_{SRS,b_{hop}} / m_{SRS,B_{SRS}}$ $S = \Pi_{b=0}^{b=b_{hop}} N_b,$ or, wherein, the third unit is configured to: calculate the SRS transmission subcarrier offset $k_0$ in accordance with the SRS transmission frequency-domain position r, and calculate according to the following equation: $k_0 = k'_0 + 4 \cdot N_{sc}^{RB} \cdot r$, wherein, $k'_0$ is an SRS frequency position offset, and $N_{sc}^{RB}$ is a number of subcarriers included in each resource block RB; wherein m is the number of resource blocks contained in a bandwidth of the layer designated by the associated sub-variable, b represents a layer, $N_b$ represents the number of branch nodes at a $b^{th}$ layer, Fb(nSRS) is the SRS frequency hop pattern frequency-domain offset, b' represent a value within the range from $b_{hop}$ to b, Nb' represents the number of branch nodes located in the $b'^{th}$ layer and contained in the $(b'-1)^{th}$ layer nodes, and $\Pi$ denotes a series multiplication.

* * * * *